United States Patent
DeMello et al.

(10) Patent No.: US 7,171,692 B1
(45) Date of Patent: Jan. 30, 2007

(54) ASYNCHRONOUS COMMUNICATION WITHIN A SERVER ARRANGEMENT

(75) Inventors: Marco A. DeMello, Redmond, WA (US); Pavel Zeman, Makawao, HI (US); Vinay Krishnaswamy, Woodinville, WA (US); Prashant Malik, Bellevue, WA (US); Kathryn E. Hughes, Redmond, WA (US); Frank D. Byrum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 09/604,939

(22) Filed: Jun. 27, 2000

(51) Int. Cl.
*H04L 9/00* (2006.01)
*H04L 9/32* (2006.01)
*G06F 3/00* (2006.01)
*G06F 15/16* (2006.01)

(52) U.S. Cl. .................. 726/26; 719/313; 719/315; 709/203

(58) Field of Classification Search ............... 709/101, 709/203, 316; 719/313, 314–316; 713/201; 726/3, 26
See application file for complete search history.

(56) References Cited

U.S. PATENT DOCUMENTS

| | | | |
|---|---|---|---|
| 4,405,829 A | 9/1983 | Rivest et al. | 178/22.1 |
| 4,688,169 A | 8/1987 | Joshi | 364/200 |
| 4,827,508 A | 5/1989 | Shear | 380/4 |
| 4,924,378 A | 5/1990 | Hershey et al. | 713/201 |
| 4,977,594 A | 12/1990 | Shear | 380/4 |
| 5,050,213 A | 9/1991 | Shear | 380/25 |
| 5,191,573 A | 3/1993 | Hair | 369/84 |
| 5,222,134 A | 6/1993 | Waite et al. | 380/4 |
| 5,359,659 A | 10/1994 | Rosenthal | 380/4 |
| 5,410,598 A | 4/1995 | Shear | 380/4 |
| 5,509,070 A | 4/1996 | Schull | 380/4 |
| 5,530,235 A | 6/1996 | Stefik et al. | 235/492 |
| 5,625,693 A | 4/1997 | Rohatgi et al. | 380/23 |
| 5,629,980 A | 5/1997 | Stefik et al. | 380/4 |
| 5,634,012 A | 5/1997 | Stefik et al. | 395/239 |

(Continued)

FOREIGN PATENT DOCUMENTS

EP       0 778 512 A2     6/1997

(Continued)

OTHER PUBLICATIONS

Flexible Control of Downloaded Executable Content, Trent Jaeger, May 1999, vol. 2 No. 2, p. 177-228.*

(Continued)

*Primary Examiner*—W. Thomson
*Assistant Examiner*—Li Zhen
(74) *Attorney, Agent, or Firm*—Woodcock Washburn LLP

(57) ABSTRACT

A server architecture for a digital rights management system that distributes and protects rights in content. The server architecture includes a retail site which sells content items to consumers, a fulfillment site which provides to consumers the content items sold by the retail site. The fulfillment site includes an asynchronous fulfillment pipeline which logs information about processed transactions using a store-and-forward messaging service. The fulfillment site may be implemented as several server devices, each having a cache which stores frequently downloaded content items, in which case the asynchronous fulfillment pipeline may also be used to invalidate the cache if a change is made at one server that affects the cached content items.

23 Claims, 10 Drawing Sheets

U.S. PATENT DOCUMENTS

| | | | |
|---|---|---|---|
| 5,638,443 A | 6/1997 | Stefik et al. | 380/4 |
| 5,654,746 A | 8/1997 | McMullan, Jr. et al. | 725/29 |
| 5,666,411 A | 9/1997 | McCarty | 705/51 |
| 5,675,734 A | 10/1997 | Hair | 395/200.01 |
| 5,708,780 A | 1/1998 | Levergood et al. | 395/200.12 |
| 5,715,403 A | 2/1998 | Stefik | 395/244 |
| 5,724,425 A | 3/1998 | Chang et al. | 380/25 |
| 5,734,823 A | 3/1998 | Saigh et al. | 395/200.06 |
| 5,734,891 A | 3/1998 | Saigh | 395/610 |
| 5,742,677 A | 4/1998 | Pinder et al. | 380/242 |
| 5,765,152 A | 6/1998 | Erickson | 707/9 |
| 5,784,609 A | 7/1998 | Kurihara | 707/9 |
| 5,809,145 A * | 9/1998 | Slik et al. | 705/52 |
| 5,845,281 A | 12/1998 | Benson et al. | 707/9 |
| 5,883,955 A | 3/1999 | Ronning | 380/4 |
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,933,498 A | 8/1999 | Schneck et al. | 380/4 |
| 5,940,504 A | 8/1999 | Griswold | 380/4 |
| 5,943,422 A | 8/1999 | Van Wie et al. | 380/9 |
| 5,949,876 A | 9/1999 | Ginter et al. | 380/4 |
| 5,970,475 A | 10/1999 | Barnes et al. | 705/27 |
| 5,982,891 A | 11/1999 | Ginter et al. | 380/4 |
| 5,983,273 A | 11/1999 | White et al. | 709/229 |
| 5,991,399 A | 11/1999 | Graunke et al. | 380/4 |
| 5,991,402 A | 11/1999 | Jia et al. | 705/59 |
| 5,999,622 A | 12/1999 | Yasukawa et al. | 380/4 |
| 6,006,332 A | 12/1999 | Rabne et al. | 713/201 |
| 6,021,492 A | 2/2000 | May | 713/200 |
| 6,029,046 A | 2/2000 | Khan et al. | 725/31 |
| 6,035,403 A | 3/2000 | Subbiah et al. | 713/201 |
| 6,049,612 A | 4/2000 | Fielder et al. | 380/44 |
| 6,067,582 A | 5/2000 | Smith et al. | 710/5 |
| 6,088,717 A | 7/2000 | Reed et al. | 709/201 |
| 6,199,053 B1 | 3/2001 | Herbert et al. | 705/76 |
| 6,226,618 B1 * | 5/2001 | Downs et al. | 705/1 |
| 6,298,446 B1 | 10/2001 | Schreiber et al. | 713/201 |
| 6,331,865 B1 | 12/2001 | Sachs et al. | 345/776 |
| 6,385,596 B1 | 5/2002 | Wiser et al. | 705/51 |
| 6,425,017 B1 * | 7/2002 | Dievendorff et al. | 709/315 |
| 6,442,687 B1 * | 8/2002 | Savage | 713/156 |
| 6,449,645 B1 | 9/2002 | Nash | 709/224 |
| 6,513,117 B2 * | 1/2003 | Tarpenning et al. | 713/156 |
| 6,606,604 B1 * | 8/2003 | Dutta | 705/26 |
| 6,629,138 B1 * | 9/2003 | Lambert et al. | 709/224 |
| 6,718,361 B1 * | 4/2004 | Basani et al. | 709/201 |
| 6,892,306 B1 * | 5/2005 | En-Seung et al. | 713/193 |
| 2001/0011238 A1 | 8/2001 | Eberhard et al. | 705/27 |
| 2002/0002611 A1 * | 1/2002 | Vange | 709/223 |
| 2002/0069265 A1 | 6/2002 | Bountour et al. | 709/219 |

FOREIGN PATENT DOCUMENTS

| | | |
|---|---|---|
| EP | 0 795 809 A2 | 9/1997 |
| EP | 0 843 449 A2 | 5/1998 |
| WO | WO 96/24092 | 8/1996 |
| WO | WO 96/42041 | 12/1996 |
| WO | WO 98/44402 | 10/1998 |
| WO | WO 98/45768 | 10/1998 |
| WO | WO 98/58306 | 12/1998 |
| WO | WO 99/01815 | 1/1999 |
| WO | WO 99/26123 | 5/1999 |
| WO | WO 99/45491 | 9/1999 |
| WO | WO 99/55055 | 12/1999 |
| WO | WO 99/63416 | 12/1999 |
| WO | WO 00/08909 | 2/2000 |
| WO | WO 00/21239 | 4/2000 |
| WO | WO 00/75760 A1 | 12/2000 |

OTHER PUBLICATIONS

Riley, M., et al. (Eds.), "Open eBook™ Publication Structure 1.0," http://www.openebook.org/specification.html, Sep. 16, 2000, 1-77.

Shamir, A. et al., "Playing Hide and Seek with Stored Keys", *Third International Conference,* 1999, franklin, M. (ed), 118-124.

Auchsmith, D., "Tamper Resistant Software: An Implementation", *first International Workshop,* Anderson, Ross (ed., ) 1996, 317-333.

\* cited by examiner

ASYNCHRONOUS COMMUNICATION WITHIN A SERVER ARRANGEMENT

REFERENCE TO COMPUTER PROGRAM LISTING APPENDIX

This application includes a computer program listing appendix on compact disc. There is one compact disc submitted in duplicate. The compact disc includes a single file named "appendix.txt," created Jun. 28, 2004. The size of the file is 7 kilobytes. The contents of the computer program listing appendix are hereby incorporated herein by reference.

FIELD OF THE INVENTION

The present invention relates generally to the field of computing, and more particularly to asynchronous communication within a server arrangement, particularly within a digital rights management architecture.

BACKGROUND OF THE INVENTION

As the availability and use of computers and palm-sized electronic devices has increased, it has become common for documents to be transmitted and viewed electronically. With improving communication over infrastructures such as the Internet, there is a tremendous drive to provide enhanced services and content to the devices. Examples of services and content that may be provided are authored works, such as books or other textual material. Electronic distribution of text documents is both faster and cheaper than conventional distribution of paper copies. The same principle applies to non-textual content, such as audio and video: electronic distribution of such content is generally faster and cheaper than the delivery of such content on conventional media (e.g., magnetic tape or optical disk). However, the low cost and instantaneity of electronic distribution, in combination with the ease of copying electronic content, is at odds with the goal of controlled distribution in a manner that protects the rights of the owners of the distributed works.

Once an electronic document is transmitted to one party, it may be easily copied and distributed to others without authorization by the owner of rights in the electronic document or, often, without even the owner's knowledge. This type of illicit document distribution may deprive the author or content provider of royalties and/or income. A problem with many present delivery schemes is that they may make no provisions for protecting ownership rights. Other systems attempt to protect ownership rights, but however, are cumbersome and inflexible and make the viewing/reading of the authored works (or otherwise rendering the authored works, in the case of non-text content such as music, video, etc.) difficult for the purchaser.

Thus, in view of the above, there is a need for an improved digital rights management system that allows of delivery of electronic works to purchasers in a manner that protects ownership rights, while also being flexible and easy to use. There is also a need for the system that provides flexible levels of security protection and is operable on several client platforms such that electronic content may be viewed/rendered by its purchaser on each platform. The digital rights management system of the present invention advantageously provides solutions to the above problems which protect the intellectual property rights of content owners and allow for authors or other content owners to be compensated for their creative efforts, while ensuring that purchasers are not over-burdened by the protection mechanism.

SUMMARY OF THE INVENTION

A server architecture is provided which supports the distribution of protected content in a digital rights management ("DRM") system. The architecture includes an activation server arrangement, and a distribution server arrangement. The architecture includes various security features that guard against unauthorized distribution or use of protected content, as well as software components that implement the security features.

In accordance with the architecture provided, content may be protected at a plurality of levels, including: no protection, source sealed, individually sealed (or "inscribed"), source signed, and fully individualized (or "owner exclusive"). "No protection" content is distributed in an unencrypted format. "Source sealed" and "individually sealed" content is encrypted and bundled with an encryption key that is cryptographically sealed with certain rights-management data associated with the content, such that the key cannot be retrieved if the rights-management data has been altered. The distinction between "source" and "individual" sealing is that "individually sealed" content includes in the rights-management data information pertinent to the rightful owner (e.g., the owner's name, credit card number, receipt number or transaction ID for the purchase transaction, etc.), such that this information cannot be removed from a working copy of the content, thereby allowing for detection of unauthorized distributors. The particular type of information included is determined by the retailer of the copy. "Signed" content is cryptographically signed in such a way that the rendering application can verify its authenticity, or the authenticity of its distribution channel. "Fully individualized" content is encrypted content provided with a decryption key that has not merely been sealed with the rights-management information, but also encrypted in such a way that it cannot be accessed in the absence of a "secure repository" and "activation certificate," which are issued by the activation server arrangement only to a particular client or set of clients, thereby limiting the use of such content to a finite number of installations.

The activation server arrangement includes one or more server computing devices which "activate" client computing devices by providing code and data to these devices, where the code and data are necessary to access "fully individualized" content on a given client device. In one example, the "data" includes an activation certificate having a public key and an encrypted private key, and the "code" is a program (e.g., a "secure repository") that accesses the private key in the activation certificate by applying, in a secure manner, the key necessary to decrypt the encrypted private key. Preferably, the key pair in the activation certificate is persistently associated with an authenticatable "persona," such that a device can be "activated" to read content that has been individualized for that persona, but not content that has been "fully individualized" for other personas. As used herein, a "persona" is a unique identifier that can be tied to a user and can be securely authenticated by an out-of-band process—e.g., a username and password form on a web browser for use over a secure socket layer (SSL) is an example embodiment of such a process. Moreover, the activation server arrangement preferably provides a given activation certificate (that is, an activation certificate having a particular key pair) only after authenticating credentials (e.g., a username and password) associated with a persona. In accordance with a feature of the invention, the number of devices that a particular persona may activate may be limited by rate and or by number (e.g., five activations within a first 90 day period, followed by an additional activation for every subsequent 90 day period, up to a maximum of ten activations), thereby preventing the unchecked proliferation of devices on which individualized content can be rendered. As one example use of this technique, protected content may be distributed as a file that includes content encrypted with a symmetric key, where the symmetric key itself is provided via a license construct embedded in the file in a form encrypted by the certificate's public key, thus making it necessary to have both the activation certificate and accompanying secure repository prior to interacting with the licensed content.

The distribution server arrangement includes one or more retail servers and one or more fulfillment sites. Retail servers sell protected content (or otherwise enlist users to receive protected content). Fulfillment sites provide the actual content that has been sold by the retail servers. The operator of a retail server may be a different entity from the operator of a fulfillment site, thereby making it possible for a retailer to sell protected content simply by entering into an agreement whereby a fulfillment site will provide content sold by the retailer. This allows the retailer to sell content without investing in the means to store or distribute the content. In one example, the retailer and the fulfillment site agree on a secret (e.g., a cryptographic key), and the retailer equips its server with software that uses the secret to create an encrypted instruction to provide the content to the purchaser. The retailer may then allow the purchaser to "fulfill" his or her purchase by providing an HTTP request to the purchaser (e.g., a POST request rendered as a hyperlink on a "receipt" or "confirmation" web page), where the HTTP request contains the address of the fulfillment site and the encrypted instruction. In the case of content requiring some level of individualization, the encrypted instruction may include the individualization information (e.g., the purchaser's name, or, in the case of "fully individualized" content, the purchaser's activation certificate). The fulfillment site receives the encrypted instruction when the purchaser clicks on the link, and the fulfillment site uses the shared secret to decrypt the instruction and provide the content in accordance therewith. A component object model (COM) object may be provided to the retailer which creates the encrypted instruction.

The fulfillment site may be organized as a fulfillment server plus one or more "download" servers and a content store. The content store stores content to be distributed to consumers. The fulfillment server maintains databases of information related to the fulfillment of content orders, such as the physical location of content items and the secret (e.g., the cryptographic key) necessary to decrypt instructions received from the retailer. The download servers perform the actual downloading of content to consumers/purchasers of the content, as well as any preparation of the content that is necessary to meet the protection requirements associated with the content (e.g., the download server may perform individualization of the content). Each download server may have a cache, where the download server obtains a copy of a content item from the content store (in accordance with the location specified in the fulfillment server database) the first time that download server is called upon to process a download of that item, where the download server stores the item in the cache for future downloads. The cache may have limits associated therewith, and it may expire items out of the cache based on an algorithm such as a "least recently used" algorithm. The download server may also provide information regarding the downloads that it processes to the fulfillment server for entry into a log. The download server may provide this information in the form of messages through an asynchronous messaging, such as MICROSOFT MESSAGE QUEUE (MSMQ). The fulfillment server may store the information in a "logging database." Additionally, when updates to information stored on the fulfillment server are made which affect the content item stored in the cache, the fulfillment server may use the messaging service to send messages to the various download servers indicating that the item should be invalidated in the download server caches.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF THE INVENTION

Figure 1:
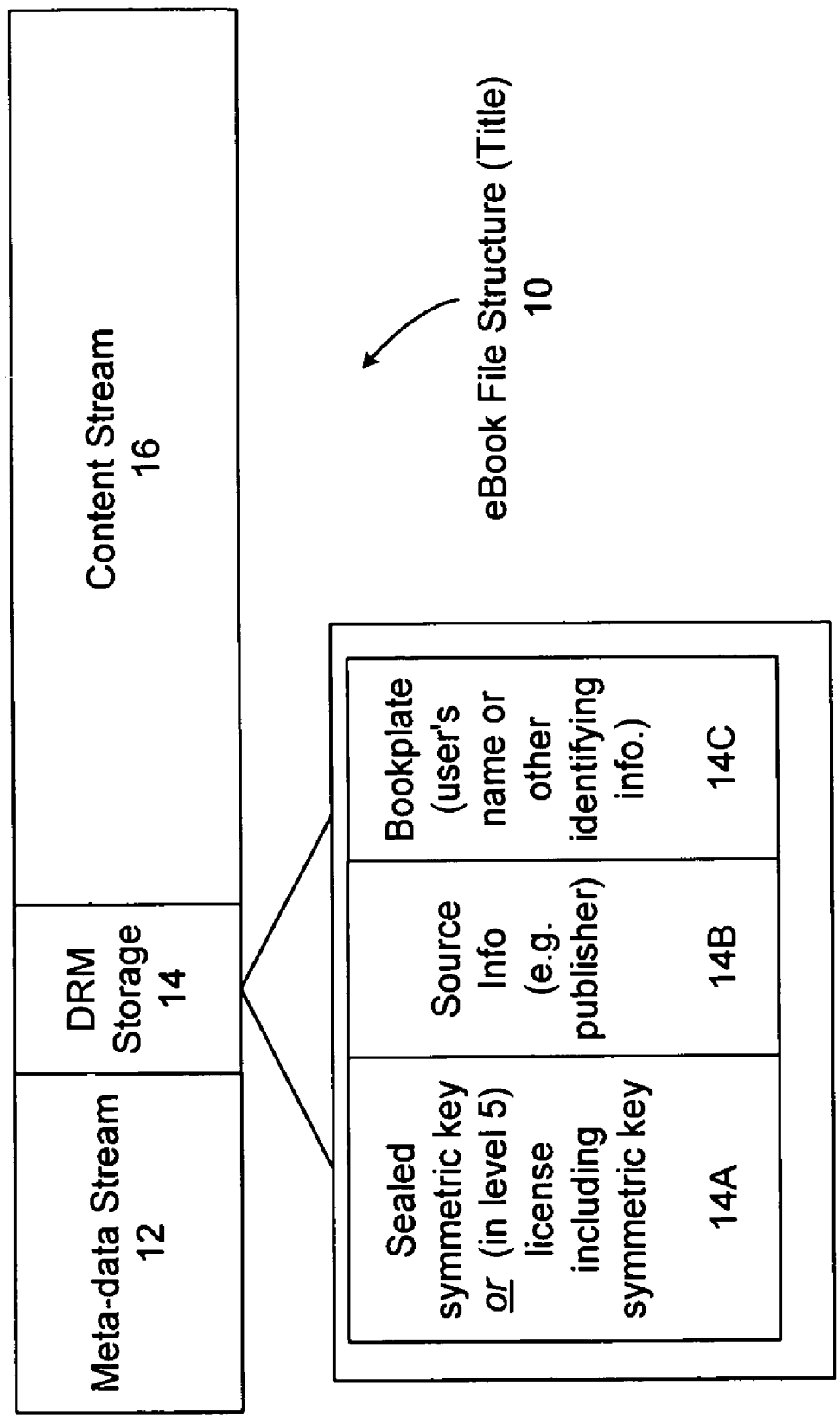
FIG. 1 is an exemplary electronic book (eBook) title file format.

The present invention is directed to a system for processing and delivery of electronic content wherein the content may be protected at multiple levels. A preferred embodiment of the invention is described, which is directed to the processing and delivery of electronic books, however, the invention is not limited to electronic books and may include all digital content such as video, audio, software executables, data, etc.

Overview

The success of the electronic book industry will undoubtedly require providing the existing book-buying public with an appealing, secure, and familiar experience to acquire all sorts of textual material. This material may include "free" or low-cost material requiring little copy protection, to "premium-quality" electronic book titles (herein "eBooks") requiring comprehensive rights protection. In order to enable a smooth transition from the current distribution and retail model for printed books into an electronic distribution system, an infrastructure must exist to ensure a high level of copy protection for those publications that demand it, while supporting the distribution of titles that require lower levels of protection.

The Digital Rights Management (DRM) and Digital Asset Server (DAS) systems of the present invention advantageously provides such an infrastructure. The present invention makes purchasing an eBook more desirable than "stealing" (e.g., making an unauthorized copy of) an eBook. The non-intrusive DRM system minimizes piracy risk, while increasing the likelihood that any piracy will be offset by increased sales/distribution of books in the form of eBooks. In addition, the present invention provides retailers with a system that can be rapidly deployed at a low-cost.

The primary users of the DRM System are publishers and retailers, who use and/or deploy the DRM System to ensure legitimacy of the content sold as well as copy protection. Exemplary users of the DRM System may be the traditional publisher, the "leading edge" publisher, and the "hungry author." The traditional publisher is likely to be concerned about losing revenue from their printed book publishing operation to eBook piracy. The leading edge publisher is not necessarily concerned with isolated incidents of piracy and may appreciate that eBooks commerce will be most successful in a system where consumers develop habits of purchase. Meanwhile, the hungry author, who would like to collect money for the sale of his or her works, is more interested in attribution (e.g., that the author's name be permanently bound to the work).

As will be described in greater detail below, the DRM System of the present invention accomplishes its goals by protecting works, while enabling their rightful use by consumers, by supporting various "levels" of protection. At the lowest level ("Level 1"), the content source and/or provider may choose no protection via unsigned and unsealed (cleartext) eBooks that do not include a license. A next level of protection ("Level 2") is "source sealed," which means that the content has been encrypted and sealed with a key, where the seal is made using a cryptographic hash of the eBook's title's meta-data (see below) and the key is necessary to decrypt the content. Source sealing guards against tampering with the content or its accompanying meta-data after the title has been sealed, since any change to the meta-data will render the title unusable; however, source sealing does not guarantee authenticity of the a copy of the title (i.e., source sealing does not provide a mechanism to distinguish legitimate copies from unauthorized copies). In the case of the "hungry author," the author's name may be included in the meta-data for permanent binding to the content, thereby satisfying the "hungry author's" goal of attribution. A next level of protection ("Level 3") is "individually sealed" (or "inscribed"). An "individually sealed" title is an eBook whose meta-data includes information related to the legitimate purchaser (e.g., the user's name or credit card number, the transaction ID or receipt number from the purchase transaction, etc.), such that this information is cryptographically bound to the content when the title is sealed. This level of protection discourages people from distributing copies of the title, since it would be easy to detect the origin of an unauthorized copy (and any change to the meta-data, including the information related to the purchaser, would make it impossible, or at least improbable, that the necessary decryption key could be unsealed).

The next level of protection ("Level 4") is "source signed." Source signed eBooks are titles that can be authenticated by a "reader" (which, as more particularly discussed below, is a user application that enables the reading of eBooks on a computing device, such as a PC, a laptop, a Personal Digital Assistant (PDA), PocketPC, or a purpose-built reading device). Authenticity may preferably be defined in three varieties: "tool signed," which guarantees that the eBook title was generated by a trusted conversion and encryption tool; "owner signed," which is a tool signed eBook that also guarantees the authenticity of the content in the copy (e.g., the owner may be the author or other copyright holder); and "provider signed," which is a tool signed eBook that attests to the authenticity of its provider (e.g., the publisher or retailer of the content). The "tool," the owner, and the provider may each have their own asymmetric key pair to facilitate the creation and validation of digital signatures of the information. A title may be both provider signed and source signed, which facilitates authentication of the distribution channel of the title (e.g., through a signature chain in the copy). The strongest level of protection is "fully individualized" or "owner exclusive" ("Level 5"). "Fully individualized" titles can only be opened by authenticated reader applications that are "activated" for a particular user, thereby protecting against porting of a title from one person's reader (or readers) to a reader that is not registered to that person. In order for the reader of the present invention to open a title protected at Level 5, the Reader must be "activated" (i.e., the device on which the reader resides must have an activation certificate for a particular persona, and a secure repository). The process of activation is described in greater detail below with reference to FIG. 8.

The systems of the present invention also define an architecture for sharing information between a reader, a content provider and a content source, how that information is used to "seal" titles at the various levels, and how that information must be structured. The availability of these choices will enable content sources to pick and choose which content will be sold to what users and using what protection (if any). The particular information may be used to sign and/or seal titles for use by a reader, and a compatible reader (which, in the case of level 5, may be a reader activated for a particular persona) may unseal the title and enable reading of the eBook.

eBook File Structure

The DRM system of the present invention protects content by incorporating it in a file structure, such as the exemplary structure shown in FIG. 1. Referring to FIG. 1, eBook 10 contains content 16, which is text such as a book (or any electronic content) that has been encrypted by a key (the "content key"), which itself has been encrypted and/or sealed. In a preferred embodiment, the key is a symmetric key 14A that is sealed with a cryptographic hash of meta-data 12 or, in the case of level 5 titles, with the public key of the user's activation certificate. This key is stored either as a separate stream in a sub-storage section of the eBook file (DRM Storage 14 in the diagram) or, in the case of level 5 titles, in the license. (In the case of level 5 titles, instead of storing the content key as a separate stream, stream 14A contains a license, which is a construct that defines the rights that the user can exercise upon purchase of the title. In titles that have a license, the content key is contained within the license.). Also included in the DRM storage 14 are the source stream 14B, which may include the name of the publisher (or other content source), as well as the bookplate stream 14C, which, for individually sealed (level 3 and/or level 5) titles, includes the consumer's name as provided by the retailer (which may, for example, be obtained as part of the commercial transaction of purchasing an eBook 10, such as from the consumer's credit card information). The method of calculating the cryptographic hash that encrypts and/or seals the symmetric key 14C (or the method of using such cryptographic hash to seal the key) is preferably a "secret" known only to trusted content preparation tools and trusted rendering applications. Using a hash in this way may complicate/discourage tampering with the meta-data 12 contained with the eBook 10. It is noted that any method may be used to "seal" an eBook, so long as such method provide some measure of tamper resistance to the eBook 10.

In accordance with the present invention, the meta-data 12 may include a copyright tag, which describes the rights granted to the user or purchaser by the content source (e.g., the publisher). Whenever such tag is present, the client (e.g., device 90 or 92 shown in FIG. 4) may display to a user the text included in the tag. It will be appreciated that the act of reminding users of the copyright laws that apply to their eBooks may serves to deter typical users from attempting to copy eBooks.

DRM System Architecture

Figure 2:
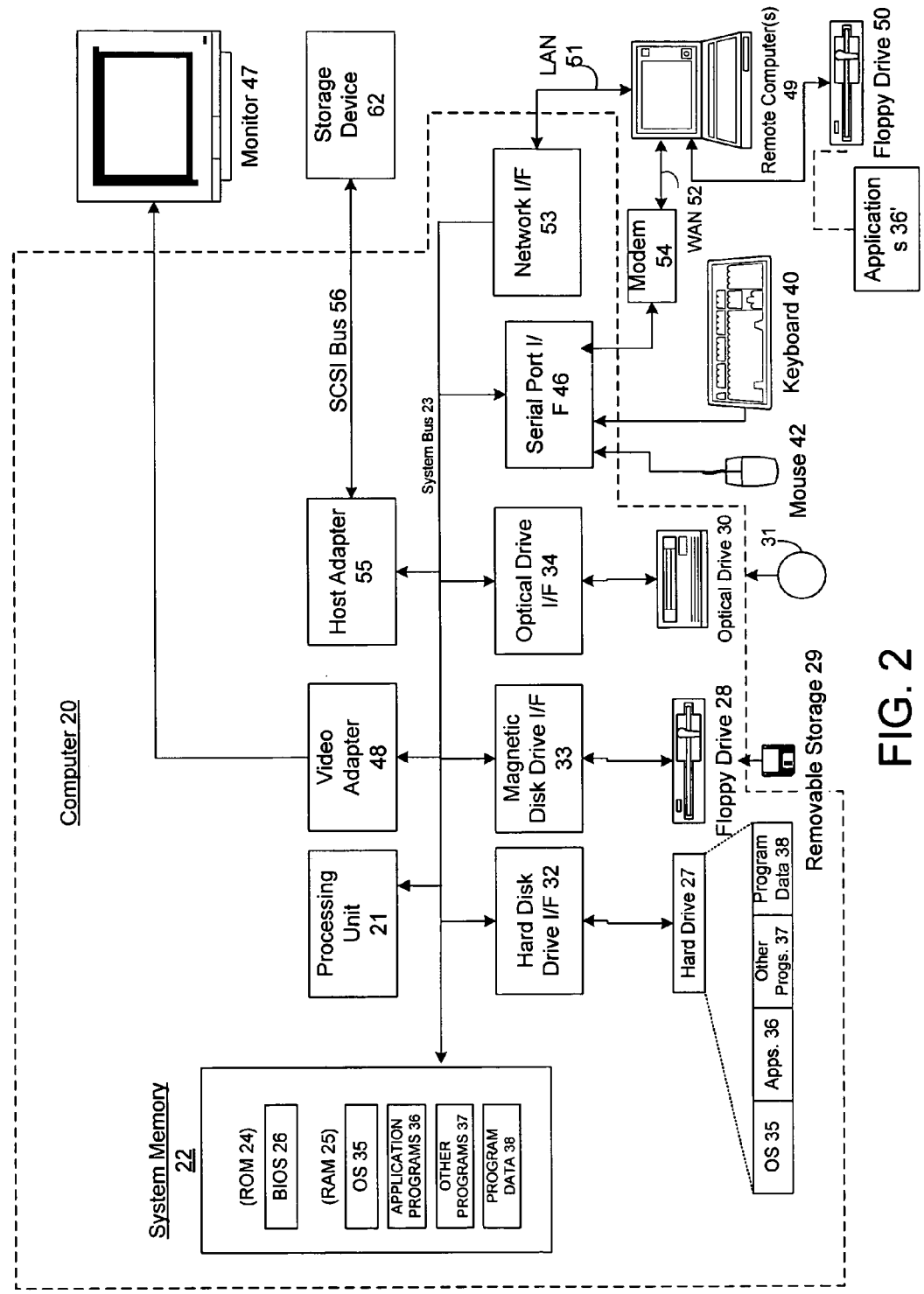
FIG. 2 is a block diagram showing an exemplary computing environment in which aspects of the present invention may be implemented.

As shown in FIG. 2, an exemplary system for implementing the invention includes a general purpose computing device in the form of a conventional personal computer or network server 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer or network server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer or network server 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows® 2000, Windows NT®, or Windows 95/98), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus 23, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer or network server 20 may operate in a networked environment using logical connections to one or more remote computers, such as a remote computer 49. The remote computer 49 may be another personal computer, another network server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer or network server 20 is connected to the local network 51 through a network interface or adapter 53. When used in a WAN networking environment, the personal computer or network server 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer or network server 20, or portions thereof, may be stored in the remote memory storage device 50. It will be appreciated that the network connections shown are exemplary and other means of establishing a communications link between the computers may be used.

Server Architecture

Figure 3:
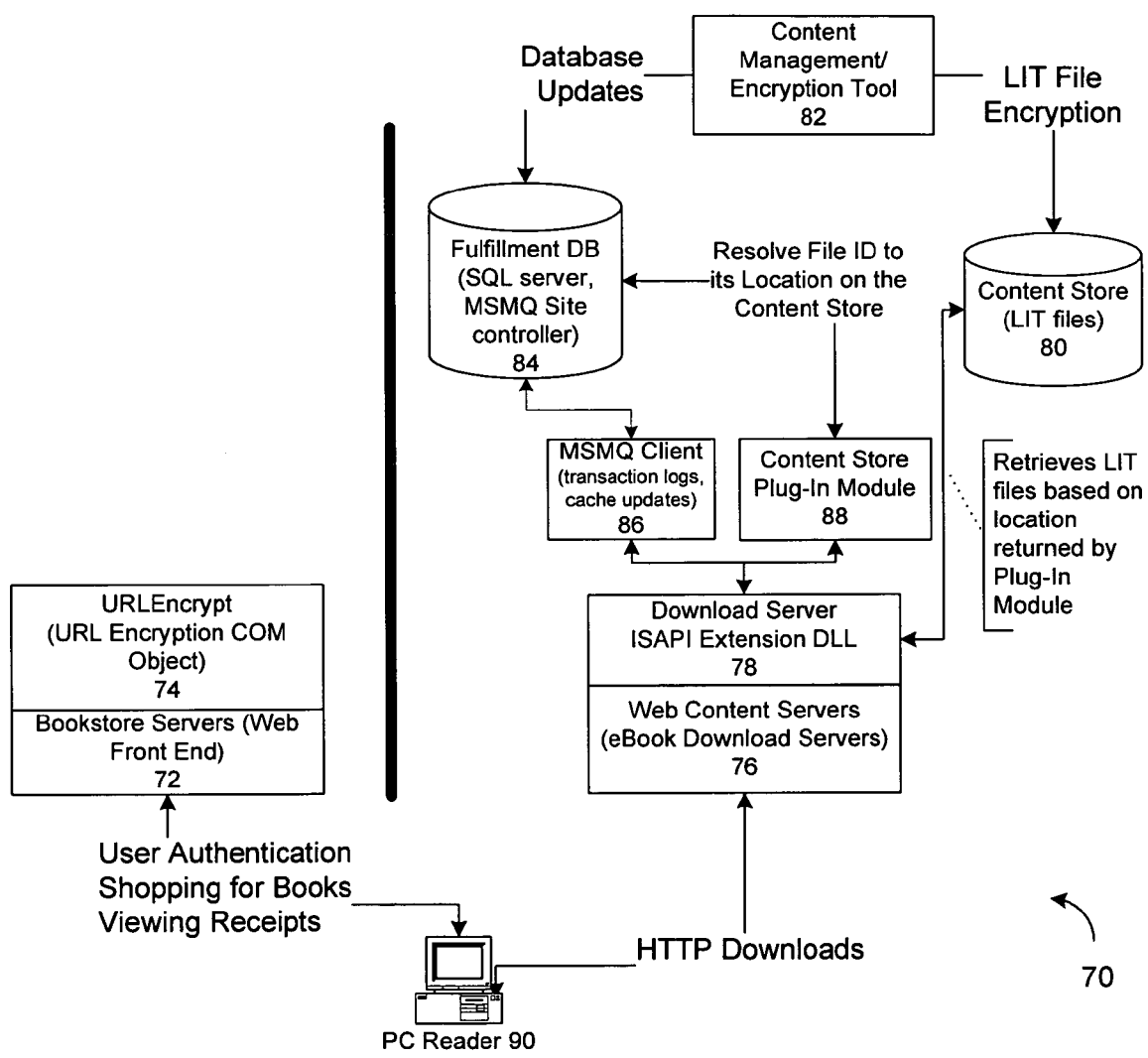
FIG. 3 is a block diagram of an embodiment of a first server architecture implementing aspects of a digital rights management system in accordance with the invention.

Referring now to FIG. 3, there is illustrated a first exemplary server architecture 70 implementing the DRM System of the present invention. Server architecture 70 is implemented and deployed at, for example, a retail/distribution site. In one embodiment of the invention, all components of server architecture 70 are associated with a single party (e.g., a large electronic bookstore) that both retails eBooks 10 and performs the actual download of eBooks 10 to customers' reading devices. In another embodiment of the invention, the bookstore servers 72 and the URL encryption COM object 74 are associated with one party (e.g., a retailer of eBooks 10 who does not perform downloads), and the other components of server architecture 70 are associated with a second party (e.g., a "fulfillment house"), which performs downloads of eBooks 10 that are sold/retailed by the first party.

The functions provided by the server architecture 70 include: encryption of source eBooks, conversion to the target reader format, generation of the license construct defining the rights granted to the user (in level 5 titles), sealing of the content prior to download in accordance with requirements (e.g., a level of protection) set forth by the publication provider, and download of eBook titles. This server architecture also includes features that provide for a flexible configuration that enables the users of this technology (content providers, retailers) to scale their system according to their needs. These features include: dynamic resolution (through a database lookup) of file IDs to physical file locations, in-memory caching of the most popular downloads for higher efficiency and better performance (where the cache may expire items based on, e.g., a least-recently-used function), and asynchronous logging of each downloaded file (also to a database) for later auditing/reporting and/or billing purposes. Other functions may be performed by the server architecture 70 in accordance with the present invention.

Bookstore servers 72 preferably are MICROSOFT® Internet Information Server (IIS) servers implemented on a network server, such as computer 20 illustrated in FIG. 2. Bookstore servers 72 may communicate with users via web browsing software (e.g., by providing web pages for viewing with a MICROSOFT INTERNET EXPLORER browser or a NETSCAPE NAVIGATOR browser). Through this communication, bookstore servers 72 may allow users to shop for eBook titles, establish their membership relationship with the retailer, pay for their transactions, and access proof-of purchase pages (serve-side receipts). URL encryption object 74 may reside on bookstore servers 72. URL encrypt object 74 encrypts a set of parameters relating to an eBook 10 that has been purchased on bookstore server 72. URL encryption object 74 may encrypt these parameters using a secret (e.g., a symmetric cryptographic key) shared between bookstore server 72 and web content server 76. For example, the parameters may include an identification of the eBook purchased, information about the purchase such as the purchaser's name or credit card number or a transaction ID (e.g., in the case of level 3 or 5 titles), and a timestamp. It will be appreciated by those skilled in the art that the parameters listed above are exemplary, and different parameters could be used without departing from the spirit and scope of the invention. The encrypted parameters may be included in an HTTP request that points to web content server 76, such that content server 76 can fulfill the purchase made at bookstore server 72. For example, after an eBook 10 has been selected by a purchaser, bookstore server 72 could upload to the purchaser's computing device a web page containing a link associated with a POST request, where the POST request points to a content server such as "www.content-provider.com", and the body of the POST contains the encrypted parameters. In an alternative embodiment of the invention, the link provided on the web page could be associated with a GET request, such as "http://www.content-provider.com/isapi/ds.dll?action=download&value=<encrypted parameters>," although this alternative embodiment has the disadvantage that some browsers place a limit on the acceptable size of a URL (e.g., 2 kilobytes), thereby restricting the size of the encrypted parameters. Whichever type of HTTP request is associated with the link, the user could then follow the link to initiate the download. Because the parameters have been encrypted with a secret shared between bookstore server 72 and content server 76, it is possible for content server 76 to verify that the encrypted parameters originated at a legitimate bookstore server 72 (e.g., one for which the operator of content server 76 has agreed to provide download services). If a timestamp is included, then content server 76 can use the timestamp to ensure that the encrypted parameters were recently generated, thereby resisting "playback attacks" (i.e., by "sniffing" of the HTTP request by one who wants to download eBooks that he or she has not rightfully purchased). URL encryption object 74 is preferably implemented as a server-side COM object, and is preferably instantiated via Active Server Pages (ASP).

The content servers 76 are preferably IIS servers implemented on a network server (preferably different from bookstore server 72). Like bookstore server 72, content server 76 may be implemented on a computer such as computer 20 shown in FIG. 2. A download server ISAPI Extension 78 is provided, which is an IIS extension DLL that preferably handles the incoming requests to the content servers 76. The ISAPI DLL 78 is responsible for validating download requests, retrieving the appropriate eBook file 10 from the content store 80 via content store plug-in module 88, individually sealing copies, returning the eBook titles 10 to the end-users, and logging the transaction into the fulfillment database 84 via an asynchronous messaging module. MICROSOFT Message Queue (MSMQ) independent client 86 is an exemplary asynchronous messaging module that may be used in server architecture 70 (and server architecture 70' depicted in FIG. 4 and discussed below). While use of Microsoft's MSMQ technology is preferable for asynchronous communication of its server-to-server messages (MSMQ Client 86), it will be appreciated by those skilled in the art that any store-and-forward messaging technology may be used. According to one aspect of server architecture 70 (and architecture 70'), such resilient messaging technology may be used to achieve high degrees of reliability and scalability, since all server to server messaging that does not require real-time communications is carried out using an asynchronous communications pipeline.

Content store 80 is preferably a large, network attached file system or database management system (or a plurality of such file systems or database management systems). Content store 80 serves as a repository for LIT titles (eBooks 10) used by the download server ISAPI 78 when fulfilling orders for eBooks 10. Content store 80 preferably exposes a Universal Naming Convention (UNC) path that can be accessed by download server ISAPI 78. For security reasons, it is preferable that content store(s) 80 exist behind a firewall and not be exposed directly to the Internet. Content management and encryption tool 82 is a component that performs functions such as converting content to the LIT format (e.g., eBook 10), encrypting and sealing each eBook title on the content store 80. Content management and encryption tool 82 also updates fulfillment database 84 with the physical location of each LIT file on the content store 80, which is mapped to their unique ID on the fulfillment database 84. Tool 82 accepts clear-text source files (LIT, OEB, HTML, etc.) and generates encrypted LIT files that are source sealed (e.g., level 2), for later retrieval by the download server ISAPI 78.

Figure 4:
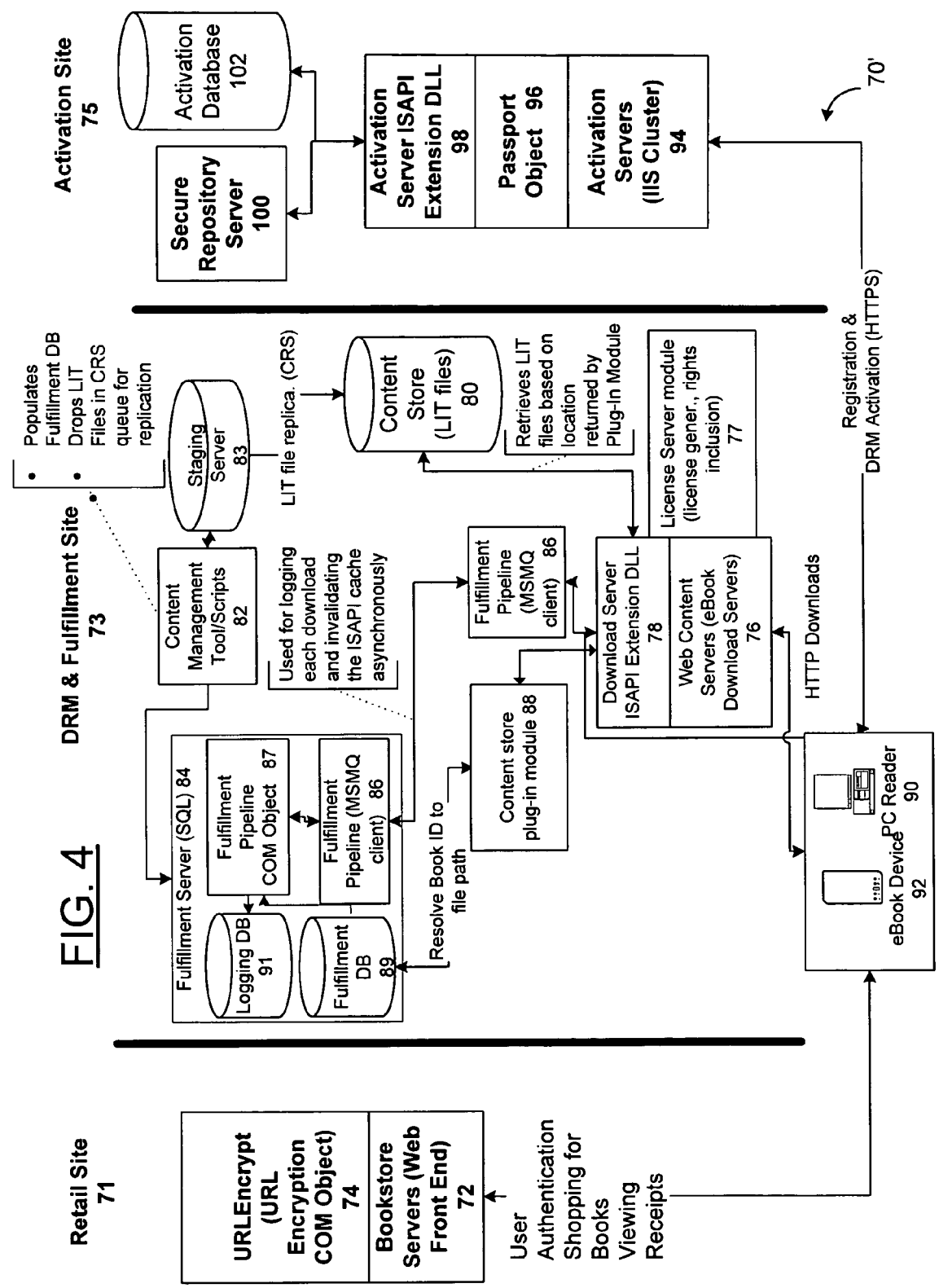
FIG. 4 is a block diagram of an embodiment of a second server architecture implementing aspects of a digital rights management system in accordance with the invention.

Referring now to FIG. 4, there is illustrated a second server architecture 70' in accordance with the present invention. Server architecture 70' is a distributed model, and includes three data centers: a retail site 71, a DRM & fulfillment site 73, and an activation site 75. As with server architecture 70, retail of content and fulfillment of content orders may be performed by a single party, or a first party may retail eBooks 10 while a second party fulfills orders for eBooks 10 that were sold by the first party. In this latter scenario, retail site 71 is associated with the first party, and DRM & fulfillment site 73 is associated with the second party. Within the architecture of FIG. 4, it is preferable that all web server-based applications be clustered behind a virtual IP address, and that content servers be dual-homed. It is also preferable that activation servers 94 rely on the MICROSOFT® PASSPORT™ membership system for associating activation certificates to end-user personas, as will be described below (although PASSPORT is merely exemplary of a namespace authority that may be used for this purpose).

The following is a brief description of the components of server architecture 70'. Bookstore servers 72 associated with retail site 71 are network servers implemented on a computer such as computer 20. Preferably, bookstore servers 72 run WINDOWS® 2000 Advanced Servers running IIS. As in architecture 70, these servers host the commercial web site that allow users to perform actions such as shopping for eBook titles, establishing their membership relationship with the retailer, paying for their transactions, and/or accessing the proof of purchase pages (server-side receipts). URL encryption object 74 is provided for integration into the retailer site 71. As in server architecture 70, the URL encryption object 74 of server architecture 70' may be implemented as a server-side COM object installed on the bookstore servers 72 and instantiated via ASP pages, and it may encrypt parameters relating to the purchase of an eBook 10 such that content server 76 may validate the encrypted parameters, authenticate the retailer via a shared secret (e.g., a symmetric key used to encrypt the parameters), avoid playback attacks, and determine the content to download to end-users.

Content server(s)/download server(s) 76 are preferably WINDOWS® 2000 Advanced Servers running IIS. Content servers/download servers 76 host the core components of the DAS fulfillment application, including download server ISAPI extension 78, content store plug-in module 88, license server module 77, and fulfillment pipeline client 86.

As noted above, the download server ISAPI Extension 78 is preferably an IIS extension DLL that handles incoming requests to the content servers 76. It is responsible for validating each download request, individually sealing copies (when necessary), requesting a license for fully individualized (i.e., level 5) copies of eBooks, returning the eBook titles to the end-users, and logging the download transaction in a database, such as logging database 91.

The content store plug-in module 88 is preferably a DLL which is responsible for determining the physical location on the content store 88 of each of the LIT files (eBooks) being downloaded, based on a combination of parameters (e.g., book ID and book ID type parameters) included on the download request (i.e., the encrypted parameters attached to the URL). Plug-in module 88 also retrieves, from fulfillment database 89, configuration information (e.g., the licensor's private key and public key certificate, a list of retailers supported and their symmetric keys, etc.) required to bootstrap the download server ISAPI extension DLL 78.

License server module 77 is a sub-component of the download server ISAPI extension DLL 78. It is responsible for generating and sealing licenses for level 5 protected LIT files. As more fully described below, a license is a construct that defines the rights that the rights that the user may exercise upon purchase of an eBook title. License server module 77 also validates the activation certificate of the user to whom the eBook is being downloaded and signs each license with the private key of the fulfillment center provider, which will later allow reader 90 or 92 to authenticate the distribution channel when the downloaded LIT file is accessed on such reader. Exemplary readers are fully described in Ser. No. 09/604,564, filed concurrently herewith, which is expressly incorporated herein by reference in its entirety.

The fulfillment pipeline client 86 is preferably a MICROSOFT® Message Queue (MSMQ) independent client, which is available with the WINDOWS® 2000 Server product family. This component implements the asynchronous communications pipeline between the download Server ISAPI 78 and the fulfillment database 89. The ISAPI 78 logs each download transaction via a message posted to the local MSMQ client 86 on each content server 76, which in turn will store and forward such message in a resilient form to a similar MSMQ client 86 hosted on the fulfillment server 84. This pipeline will also be used for invalidating cached entries on an ISAPI RAM cache (located on content servers 76), via messages that are posted from the fulfillment server 84 to the ISAPI DLL 78 via the same set of locally hosted MSMQ clients.

As in server architecture 70, the content store 80 of server architecture 70' is preferably a large, network attached file system or database management system. It serves as a repository for the LIT titles used by the download server ISAPI 78 when fulfilling the orders. This server preferably runs WINDOWS® 2000 Advanced Server and exposes a UNC path that can be accessed by the download server ISAPI DLL. This may be accomplished via a setup application provided by DAS. It is also preferable that the content store 80 exists behind a firewall and is not exposed to the Web.

The fulfillment server 84 is preferably a WINDOWS 2000 Advanced Server running MICROSOFT® SQL 7.0 (or later). This server hosts a fulfillment database 89, a logging database 91, a fulfillment pipeline client 86, and a fulfillment pipeline COM object 87. Fulfillment database 84 hosts tables that map the combination of a "Book ID" and "Book ID Type" to the physical location of each LIT file on content store 80. Database 84 also contains information about each LIT file that may be required for fulfillment, such as the book title, the book author, DRM protection level, and/or suggested retail price. The full range of information may vary in accordance with the business rules/practices of each fulfillment center (e.g., the entity that operates content server 76), but preferably the information includes those items listed above. A command-line script may be provided that creates the necessary tables and stored procedures for this database, in addition to adding sample entries that can be used as reference by the fulfillment center when designing their content management processes.

Logging database 91 is used for logging each download transaction from the download server ISAPI DLL 78 (for later billing/reporting when applicable). The fulfillment pipeline client 86 is preferably a MICROSOFT® Message Queue (MSMQ) independent client which exists on the content/download servers 76, as described above. The fulfillment pipeline object 87 is preferably a COM object that is triggered by the MSMQ independent client hosted on the fulfillment server 84 each time an incoming message is written to the inbound queue on this server. Fulfillment pipeline object 87 extracts the logging information from each MSMQ message and write it to logging database 91, where it may later be used by reporting scripts. Additionally, fulfillment pipeline object 87 will be triggered by changes in the fulfillment database 89 and will push any update/delete information to the various MSMQ independent clients 86 hosted on the download servers 76.

Content management tool 82 is responsible for managing the information stored in the fulfillment database 89. When LIT files are added to the content store 80, this tool writes the appropriate fields into the fulfillment database 89 (e.g., the Book ID to physical location mapping) such that content store plug-in module 88 may later find the requested LIT files. Similarly, if any changes are made (e.g., a change the DRM level on a LIT file) this tool provides the interface from which those responsible for the content management function inside the fulfillment center (i.e., human content administrators) would carry out these tasks.

Fulfillment centers 73 may accomplish the task of content management by building a set of ASP pages that, via standard IIS COM objects, write all the relevant information into the fulfillment database 89 and place the incoming LIT file (already encrypted as a source sealed copy) into a staging server 83, which would mimic the directory structure of the production content store 80. From there, LIT files would be automatically replicated using, e.g., Site Server 2000 Content Replication Server, into the production content store server. Staging server 83 is not necessarily required to implement the DAS system, but it is an advantageous approach to replicate LIT files from the network of the fulfillment partner into the production content store servers by using tools such as MICROSOFT® content replication server (CRS).

The activation servers 94 perform the function of providing each client reader (e.g., PC reader 90 or dedicated reading device 92) with a unique secure repository and an activation certificate. An exemplary secure repository, and systems and methods for providing same, are disclosed in Ser. No. 09/604,543, filed concurrently herewith, which is expressly incorporated herein by reference in its entirety. The secure repository and activation certificate associates the activated reader with an online persona (e.g., a MICROSOFT® PASSPORT™ ID) to ensure that users will be able read their rightfully acquired titles on all instances of readers that they own or have activated to their persona (but not on non-activated readers, or readers not activated for that persona)—assuming they activate their readers using the same user ID and password every time.

Activation Server 94 includes a PASSPORT object 96 and an activation server ISAPI Extension DLL 98. The PASSPORT object 96 provides the required interfaces into the PASSPORT™ servers that authenticate the end-users using, for example, their hotmail accounts (or other PASSPORT credentials). In accordance with aspects of the present invention, this object advantageously associates the activation certificate with a persona, instead of a single PC, thus allowing each persona to utilize multiple readers to read level 5 titles. While it will be appreciated that tying level 5 titles to a "persona" permits wider use of level 5 titles than if they were bound to a single device, defining a persona in terms of an established namespace authority such as PASSPORT servers is also serves the goal of limiting the unrestrained use of level 5 titles that might otherwise exist if users were permitted to use an arbitrary label to function as a persona. In the case of PASSPORT credentials, personal information relating to a particular user is associated with that user's PASSPORT credentials, possibly ranging from the user's E-mail account to his credit card number. Thus, a user is unlikely to share his PASSPORT ID and password with a large group of people, thereby ensuring that the persona to which a reader is activated is genuinely associated with a particular user (or, possibly, a family that shares a single PASSPORT account). While a PASSPORT server is an exemplary namespace authority that can provide this advantageous feature, it will be appreciated that other namespace authorities could be used without departing from the spirit and scope of the invention. In such an alternative embodiment, PASSPORT object 96 would be replaced with a different object which communicates with the alternative namespace authority.

The activation server ISAPI Extension DLL 98 carries out tasks associated with the activation process on the front-end activation servers, including receiving a hardware ID uploaded by the reader client, creating a unique machine ID based on the hardware ID, posting a request to the secure repository server(s) 100, signing each unique secure repository received from secure repository server(s) 100, generating and (optionally) encrypting the activation certificate, updating activation database 102, and downloading both the secure repository and the activation certificate to the reader client. The activation process is more particularly described below in connection with FIG. 8.

The secure repository servers 100 are preferably stand-alone servers located behind a firewall in a data center. They are accessed by the activation servers 94 for generating individualized secure repositories for each reader being activated. These servers are preferably dedicated, and preferably run a WINDOWS® 2000 or WINDOWS NT® service that exposes a socket interface to activation servers 94. The secure repository service links a distinct executable for every unique machine ID and passport ID combination posted. The task of preparing an individualized secure repository is, in many cases, computationally intensive. Therefore, in a preferred embodiment there is a sufficient number of secure repository servers 100 to provide secure repositories to readers in real-time (e.g., a few seconds per activation), taking into account the expected volume of activation traffic.

The activation database 102 is preferably a MICROSOFT® SQL 7.0-based server that stores activation information related to each end-user of the reader 90 or 92 (based on their PASSPORT™ IDs). Such information may include: Machine IDs, the number of activated readers, the date of first activation, the product ID (PID) for each of the reader installations, their PASSPORT™ profile info, etc. This information is used to ensure that users are not abusing the system, helping users recover from hard-drive crashes, and aiding in allowing users to continue reading the content they purchased after a hardware upgrade. For example, the number of activated readers and the date of the first activation associated with a particular PASSPORT credential could be used to impose a limit on the number of activations (e.g., no more than five activations for a given persona in the first 90 days following the first activation, with an additional activation permitted each 90 days thereafter, up to a total of 10 activations). Imposing such a limit (or some other type of limit) has the effect of preventing the unchecked proliferation of readers activated to a single persona (which, in the worse case, could result in a level 5 title being readable on millions of reading devices, thereby thwarting the goal of controlling distribution of valuable content). Additionally, the other information in activation database 102 enables users to use level 5 titles after a hardware upgrade (or after a hard disk crash), without having to re-download titles or licenses. In this instance, all a user needs to do is to activate the reader on the upgraded (or repaired) hardware with the same PASSPORT™ ID.

Activation database server 102 is preferably located behind a firewall and is only accessible by the front-end activation IIS servers on the same private network where the secure repository servers are located. A replica of activation database 102 may be accessed via offline scripts to generate reports of the number of activations per day, week, month, average of activations per PASSPORT™ ID, etc.

Receipt Infrastructure

As described briefly above, the server architecture of the present invention includes a URL encryption object 74, which encrypts certain parameters relating to the sale of an eBook 10, where the encrypted parameters are includable in a URL. The following is a more detailed overview of the use of URL encryption object 74.

URL encryption object 74 facilitates a decoupling of the seller of eBooks (e.g., the retailer) from the entity that actually provides the LIT file to the purchaser (e.g., a fulfillment center). The URL encryption object 74 performs this function by encrypting information relating to the purchased eBook with a secret (e.g., symmetric key 75), which is shared between the fulfillment center and the retailer. In an exemplary scenario, the retailer enters into a business relationship (e.g., a contract) with a fulfillment center, whereby the fulfillment center agrees to provide content download services for the retailer who does not actually have an electronic stock of eBooks or the server devices needed to download eBooks to a large number of purchasers. As part of this relationship, the retailer and fulfillment center agree on a secret symmetric key 75, which will be used by URL encryption object 74 on the retailer site, and by ISAPI extension DLL 78 on the fulfillment center site. Essentially, the retailer uses the URL encryption object 74 and the secret symmetric key 74 to encrypt information relating to the purchase of an eBook, and includes this encrypted information as a parameter to a URL that points to the fulfillment center site. The URL is then rendered on the purchaser's browsing software as a "receipt page," where the "receipt" is a hyperlink to the URL that invokes the download from the fulfillment center. When the user follows the link, the fulfillment center receives the encrypted parameter and decrypts it using shared secret symmetric key 75. Because the parameter is encrypted, any secret information that needs to be exchanged between retailer and the fulfillment site can safely be provided in encrypted form to the purchaser's site, since the purchaser does not know the symmetric key 75 (and, presumably, other lurking eyes on the web also do not have access to symmetric key 75). Moreover, when the fulfillment center decrypts the encrypted information to obtain the information necessary for the download, proper decryption of the information authenticates the "receipt" as having been generated by a legitimate retailer, since presumably no one other than the retailer has the symmetric key 75 necessary to properly create the encrypted parameter. It should be noted that symmetric key 75 is merely exemplary of the type of secret that could be shared between a retailer and a fulfillment center to permit this manner of communication. In an alternative embodiment, asymmetric key pairs could be used, or the retailer and fulfillment center could agree on a secret keyless encryption method.

Figure 5:
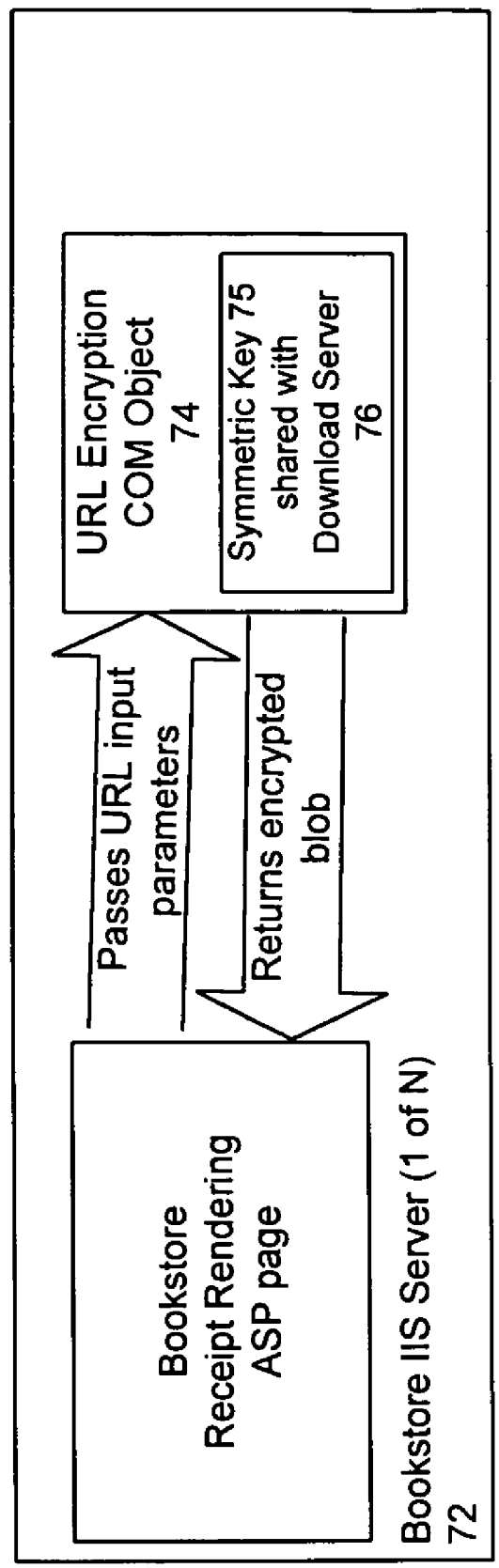
FIG. 5 is a block diagram illustrating certain interactions within a content provider server in accordance with aspects of the invention.

FIG. 5 depicts the use of URL encryption object 74 to create the encrypted parameter. URL encryption object 74 encrypts the URL parameter using a symmetric key 75 (the URL "secret") that is shared between the download server ISAPI 78 and the URL encryption object 74 on the retail server. In a hosted scenario, where a fulfillment center provides for the download of LIT files sold by a large number of retail sites, a symmetric key 75 is provided to each retailer as they enter into a contract with the fulfillment center 73. It is important to note that this symmetric key 75 can be unique per retailer 71. Fulfillment center 73 may store the keys for each retailer in fulfillment database 89. It should be noted that symmetric key 75 used for encryption of the URL parameter is different from the symmetric keys 14A generated by the content management and encryption tool 82 to encrypt the LIT files.

A single exported method on the URL encryption object 74 ("Encrypt( )"), creates the encrypted URL parameters. Preferably, the Encrypt( ) method takes the following parameters to be incorporated into the encrypted blob that will be used in the URL:

TransactionID—a string that uniquely identifies each transaction on the bookstore site 72;

BookID—a unique identifier, which is used by download server 76 to locate the proper LIT file via content store plug-in module 88 (which looks-up the BookID in fulfillment database 84);

BookIDType—identifies which type the ID is (e.g. ISBN, DOI, PATH, etc.). URL encryption object 74 preferably does not validate this field, or its relationship to the ID. Download server ISAPI 78 later uses this field as an additional input parameter to the lookup performed by the content store plug-in module 88;

UserName—a string containing the name of the rightful owner of the eBook purchased. This string preferably maps to the consumer listed in the credit card used for the commercial transaction, although this is left as policy to be set by the content source (e.g. the publisher) in accordance with the fulfillment center. This string is the name that will later by used by the Download Server ISAPI 78 to individually seal the titles (i.e. to generate the Bookplate). It will be recalled that individualized titles (e.g., level 3 and level 5) incorporate the user's name into the LIT file and bind that name to the decryption key, so that the origin of unauthorized distribution of content can be detected. Therefore, it is preferably that the purchaser's name come from a reliable source (such as the user's credit card), rather than from an unverifiable source (such as user input). Although the foregoing example assumes that a name will be inserted into this field, the actual contents of the field is determined by the retailer, and it could contain any information (e.g., credit card number, transaction ID, receipt ID, etc.)—preferably information that relates to the purchase or purchaser so as to permit surveillance and tracking of the copy;

PASSPORT ID—The persona ID associated with the user, which is provided by the user during activation. This field is later used by the content server to compare with the activation ID in the activation certificate. It should be noted that, while the PASSPORT ID is contained in the activation certificate, that ID is not uploaded to bookstore server 72 during the purchase transaction. Rather, the activation process, in addition to inserting the PASSPORT ID into the activation certificate, also stores the PASSPORT ID in the registry on the user's computing device, and it is the registry instance of the PASSPORT ID that is provided to bookstore server 72; and SecurityLevel—this string indicates what level of DRM this particular publication requires. This will later be converted into a number and stamped into the title's meta-data 12 by the download server ISAPI 78;

Optionally, the following input parameters may also be included with a request:

Cost—the price that the merchant (i.e., retailer 71) paid for that eBook title at the moment the tile was sold to the consumer;

MSRP—recommended price from the publisher at the moment the tile was sold;

Price—the price by which the eBook title was sold. This is an optional parameter, and if present will be used by the download server for logging purposes and, potentially, for billing purposes;

FriendlyFileName—this string is used by the download server when setting the filename for the LIT file being downloaded via the response HTTP header; and CustomerID—a unique identifier for the end-user purchasing the eBook title. The merchant (i.e., retailer 71) may require this information as part of the reports it receives from the fulfillment center.

The above parameter list is extensible and should not be interpreted as limiting or the full set supported by the URL encryption object 74. Additional attribute-value pairs may be added, since the URL encryption object 74 will encrypt the whole set of values passed and returns them to the calling function.

Preferably, the URL encryption object 74 adds a timestamp and version. The timestamp is string which preferably contains a representation of the number of nanoseconds passed since 1601 (in GMT system time) on the local machine where the URL encryption object 74 is installed. This value may be used by the download server to calculate a time-to-live (TTL) in order to avoid playback attacks (i.e., someone stealing a URL and playing it back to download a book. The version field is an unencrypted string identifying the version of the URL encryption object 74 that created the encrypted blob in the URL.

After the retailer 71 obtains the encrypted string back from the URL encryption object 74, the retailer 71 builds a POST request that points to the download server 76 for fulfillment. The encrypted blob returned by the URL encryption object 74 is included in the body of each POST. In addition to the encrypted parameters, retailers may need to provide a RetailerID in the URL which identifies the retailer. This may be used by the download server ISAPI DLL 78 to map the incoming request to the appropriate URL symmetric key 75 for decryption in the case where multiple retailers are being supported by a single download server site 76. This is an optional field and if not provided, the download server ISAPI DLL 78 at the fulfillment site 73 will later use its default symmetric key 75 provided during setup for decrypting the URLs.

Therefore, in accordance with the above, assuming an input to the URL encryption object 74 such as: TransactionId=R6RAKHAL9TS12JTG00QP9ESTQ4&BookId=044021145X&BookIdType=ISBN&Username=Pavel+Zeman&SecurityLevel=3

The Encryption COM object 74 may return the following encrypted blob: LCfsQCLuMg9UZtWxIdYTfw%2BzMtj-XAN%2BiU0YHaomrY3ydXhw3p9T1wZuH%2BFEHT-EP687Nq17wbMMwnbtHAkIjkKhKS%2BYKwgHj7%2-FNr%2BvBD50APwqMbvN3saNBrPxG8s1ziU1iX%2-F%2BSS%2FttA%2F4GZjRMo5uXWM%2BZr5dYHkSf-WfBBC0iH7 uLFo1yIz8LSI=&Version=1.0

The URL encryption object 74 URL encodes the encrypted blob, such that it complies with the required HTTP standard for ANSI URLs. The URL encryption object 74 accepts both Unicode and UTF-8 strings, and handles UTF-8 conversion from Unicode internally. Optionally, the URL encryption object 74 use UTF-8, if provided, which reduces the size of the resulting encrypted end escaped blob for non-Unicode input by approximately one-half. The URL encryption object 74 preferably computes a cryptographic hash of the data to be encrypted prior to encrypting such data, and includes the hash with (e.g., in front of) the encrypted and encoded data. This hash may later be used for comparison by the download server to verify that the decrypted data has not been tampered with between the retail site and the download server. For example, the full parameter (e.g., to be included in the body of a POST request), may read:
VALUE="&Hash=bCt/xn4lfTJw7cPQjstge+6Lifc=
&Data=zAybPKWl23d2O+. . . encoded_data_continues . . . MSSD8Eyw==&Version=1.5,"

The download server ISAPI 78 is responsible for the individualization and download of eBook titles to end-users. Also, parsing and validation of each URL generated by the URL encryption object 74 is performed by the download server ISAPI DLL 78. This includes decrypting the URL using the appropriate symmetric key 75, which can be either a default key or, in the case where a retailer ID is provided, a string resulting from a database lookup via the content store plug-in module. The download server ISAPI DLL 78 also resolves the mapping of Book ID and Book ID Type from the passed URL into a file share location preferably via a plug-in module. The plug-in module retrieves that information from the fulfillment database and enables content providers to add their own mapping database and naming convention rules.

The download server ISAPI 78 also determines the DRM protection level required for the download of the requested LIT file. The level will be determined based on an indication from the fulfillment database 89 of the DRM Level for the title being downloaded. For example, if the URL created by the retailer defines a DRM level lower than that specified in the fulfillment database, an error message will be returned to the Retailer 71. Also, the ISAPI will fetch the eBook title for download from the content store 80 into a local memory cache, if not cached, strip the symmetric key 14A (see FIG. 1) from the LIT file prior to caching it locally on the IIS server, and cache the key 14A in memory for future use.

In the case of DRM level 3 titles, the download server ISAPI 78 inserts the user's name from the URL encrypted blob into the LIT file as a separate stream, re-hashes the meta-data with the contents of this new stream, seals the symmetric key 14A with the newly computed cryptographic hash, and re-insert the newly sealed symmetric key into the LIT file for download. In the case of DRM level 5 titles, the download server ISAPI generates a license XML structure (in addition to the level 3 actions noted above), seals the symmetric key with the public key from the end-user's activation certificate, and embeds the license in the LIT file.

The download server ISAPI 78 also downloads the LIT file to the end-user, releases the temporary storage used during individualization of the LIT file, and logs each download request into either a local file on the IIS server or to the logging database 91, via the asynchronous fulfillment pipeline discussed below. This may be performed via a message post to the local MSMQ client resident on each Download Server 76.

The download server ISAPI extension DLL 78 responds to a set of commands defined by the "?action=" parameter. Preferably, there are two actions supported by the download server ISAPI 78: download and verify. The download action is the command that causes the ISAPI 78 to follow the steps identified in FIG. 7 and return an eBook title to the user. The verify action is used to request the ISAPI 78 to verify that a given BookID exists in the content store 80 and is ready for download. The most common command (download) may look like the following URL: http://content-provider.com/isapi/ds.dll?action=download&value=. . .

The /isapi/ parameter in the URL indicates the virtual root where the ISAPI 78 was installed. In this example the ISAPI 78 is called ds.dll (Download Server DLL). The name of ISAPI 78 is followed by the action, which is followed by the relevant parameters to carry out that action (the "value" parameter in the above example). In this examples, the relevant parameters comprise the encrypted blob generated by the URL Encryption COM object 74.

Each download request will include, in the body of the POST, the URL for the error-handling page on the retailer site 71. The download server 76 uses this URL whenever an error occurs and redirects the client to that page, with the error code tagged in the query string. In the event of an error, the retailers may provide an HTML UI, a support number, an e-mail link, or trouble-shooting instructions. In accordance with an aspect of the present invention, the download server ISAPI DLL 78 preferably does not render errors, but rather, redirects the users to the required error handling URL from the POST request.

From a data-center management and operability standpoints, the ISAPI 78 will expose performance counters (i.e., PerfMon counters) and WINDOWS NT® events. These are typical WINDOWS® 2000 and WINDOWS NT® operational practices for data-center deployment and management of server components. WINDOWS® 2000 and WINDOWS NT® events are logged whenever an error occurs. Some of the key events that are preferably logged by the ISAPI 78 are:

Failure to Initialize—any missing configuration and/or required environment setting that caused the ISAPI to fail on load;

Failure to Connect to the Content Store—either the UNC path returned by the content store plug-in module was invalid or the content store 80 and/or network path to it is down. In either case, the ISAPI must log an error such that data center operators can take proper action;

Illegal URL Request—this event must be logged whenever a URL request does not comply with the expected format or has not been encrypted by the symmetric key 75 shared between the ISAPI 78 and the URL COM Object 74. Ideally, the full URL should be posted on the event, along with the originating IP, for audit purposes;

Failure to locate a LIT file—either the path on the request was invalid or the LIT file is missing from the target share;

Failure to cache LIT file—this can happen if the content server 76 hosting the ISAPI 78 runs out of memory, or if a network problem occurred during file transmission from the Content Store 80;

Failure to create Bookplate—this event must be logged anytime the ISAPI 78 is unable to carry out the individual sealing of the title. The nature of the error must be included on the event itself, for later debugging;

Failure to download title—this event must be logged whenever a download fails (time-out, connection broken, etc.); and Startup/Shutdown events—whenever the ISAPI 78 is (un)loaded, it must log an informational event to this extent, such that proper visibility exists. There may be cases when an ISAPI 78 is unloaded by IIS and data center operators need to re-start IIS or even WINDOWS NT® to get the content server 76 back into a fully operational state.

The Download Server ISAPI 78 also preferably expose the following Performance Counters:

Total download requests—measured in unique requests accepted since last startup of the server;

Total successful downloads—measured in unique requests fulfilled since last startup of the server;

Download requests/sec—number of unique incoming requests/sec;

Successful downloads/sec—measured in unique requests fulfilled per second;

Pending download requests—total number of requests being processed at any given time;

Failed download requests—total number of failures since last startup of the server;

Average request processing time—measured in milliseconds, it reflects the average time the ISAPI is taking to process incoming requests; and Last request processing time—measured in milliseconds, it reflects the time it took for the ISAPI to process its most recent request;

Combined, the WINDOWS NT® events and PerfMon counters will allow a host of existing data center monitoring and management suites to administer the ISAPI 78 during the deployment of the system.

Asynchronous Fulfillment Pipeline

The Asynchronous Fulfillment Pipeline performs asynchronous logging of download requests into the logging database 91 and asynchronous invalidations of cached entries by the download servers ISAPI DLL. The asynchronous fulfillment pipeline server accomplishes these tasks by leveraging the existing store-and-forward functionality provided by the MICROSOFT® Message Queue (MSMQ) component of Windows® 2000.

Figure 6:
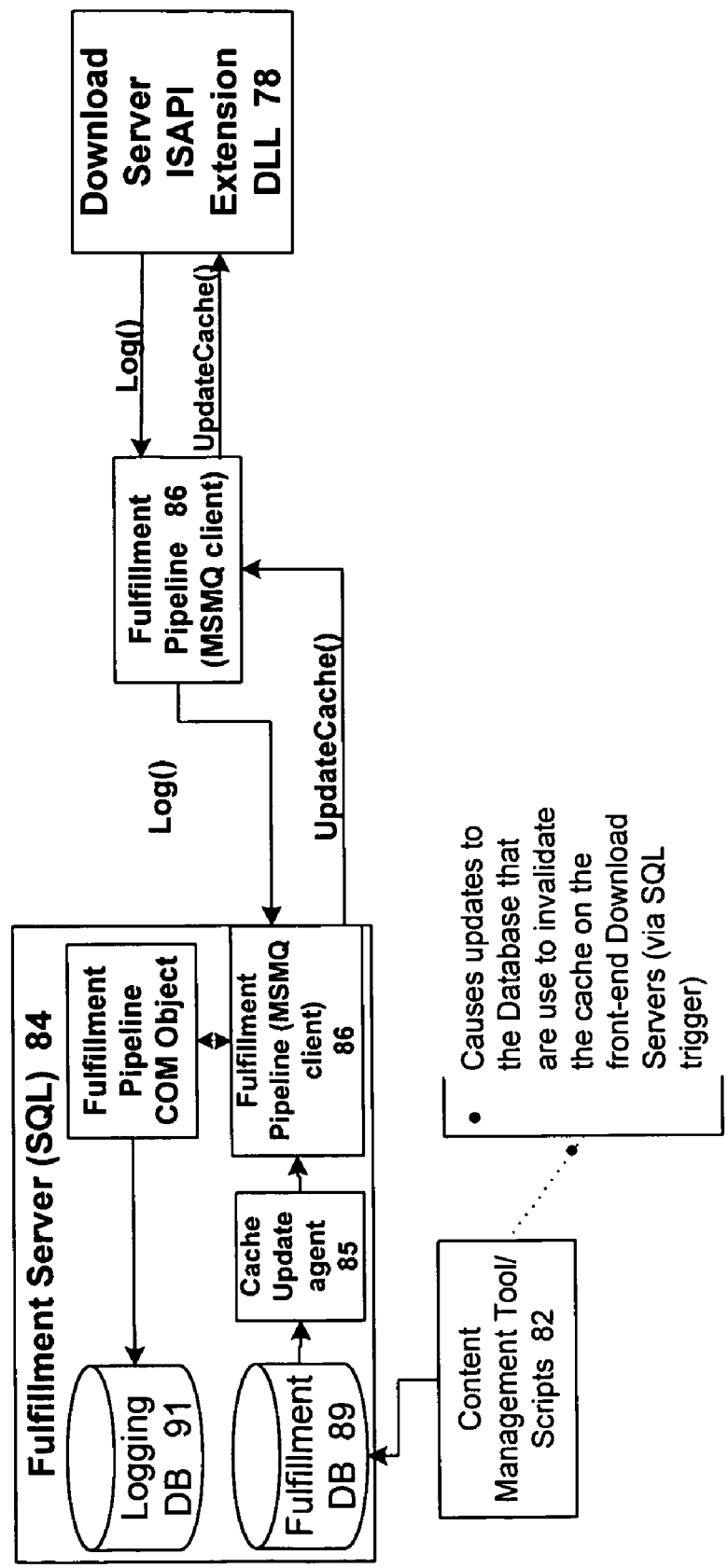
FIG. 6 is a block diagram showing components of an asynchronous fulfillment pipeline in accordance with aspects of the invention.

The architecture for the fulfillment pipeline is show in FIGS. 4 and 6. The fulfillment pipeline object 87 is executed by the MSMQ trigger service and writes to the logging database each time an incoming message appears in the inbound queue of the local MSMQ client 86. Preferably, fulfillment pipeline object 87 is implemented as a COM object. The cache update agent 85 has an associated executable that is spawned by a SQL trigger anytime an update or a delete operation occur on the fulfillment database 89. The download server ISAPI extension DLL 78 will both read and write to/from the local MSMQ independent client 86.

A logging function preferably runs on the logging database 91 to persist all parameters that are passed on the body of each POST request for downloads. The fulfillment pipeline COM object 87 is instantiated on the fulfillment server 84 as each individual logging message arrives in the inbound queue of the local MSMQ independent client 86 on the fulfillment server 84. The logging database 91 schema is described in further detail below. The information from the body of each POST request to the download servers 76 is converted into a MSMQ message format and posted to the inbound queue of the local MSMQ client 86 on the fulfillment server 84.

The MSMQ client 86 on the fulfillment server 76 then picks up this message packet and invokes, via the MSMQ triggers service, the fulfillment pipeline COM object 87, which converts the message to database format and writes it in the database, via a Data Source Name (DSN) on the fulfillment server 84 that abstracts the name, location, and login credentials for the logging database from the COM object.

As the content management tool 82 updates and/or deletes records from the fulfillment database 89, a cache update agent executable 85 is triggered by the SQL server (using standard SQL update/delete triggers). Cache update agent 85 performs a similar function to the fulfillment pipeline COM object 87, but in the opposite direction. Given that update and delete operations to the fulfillment database 89 may require cache updates to the front-end download server ISAPI DLLs 78, this agent will form a MSMQ message and post it through the independent MSMQ client 86 to all the download servers 76 (the fulfillment server 84 should have a list of all installed download servers 76).

On receiving the cache update message, the MSMQ client 86 on the download server 76 calls a function on the ISAPI extension DLL 78 to update the cache. This action removes the cache entry. The next time a request is received for this particular Book ID, the download server 76 will again query the fulfillment database 84 and then update the cache with the new LIT file and its relevant attributes. The size of the cache for the download server 76 is determined by the amount of free memory on the physical server. It is preferable that the ISAPI DLL 78 allocate up to 80% of the available memory on the server.

License Generation

Licenses are preferably generated for all signed and fully individualized titles (i.e., level 5). The source publication may also be accompanied by a license that constitutes the source signature, thus ensuring authenticity of the eBook being purchased by the consumer. Licenses can be delegated and the license chain preferably originates at the publication providers (i.e., authors and publishers) and ends at the buying consumer. In accordance with the present invention, rights may preferably be delegated by licensors but not by consumers. An end-user license is typically generated at the time of download. In some cases, the retailer will name the rightful owner of the eBook (in the case of individually sealing) in the license, which is later exposed via the UI (by a feature of the reader 90 or 92) when consumers open their eBooks.

Figure 7:
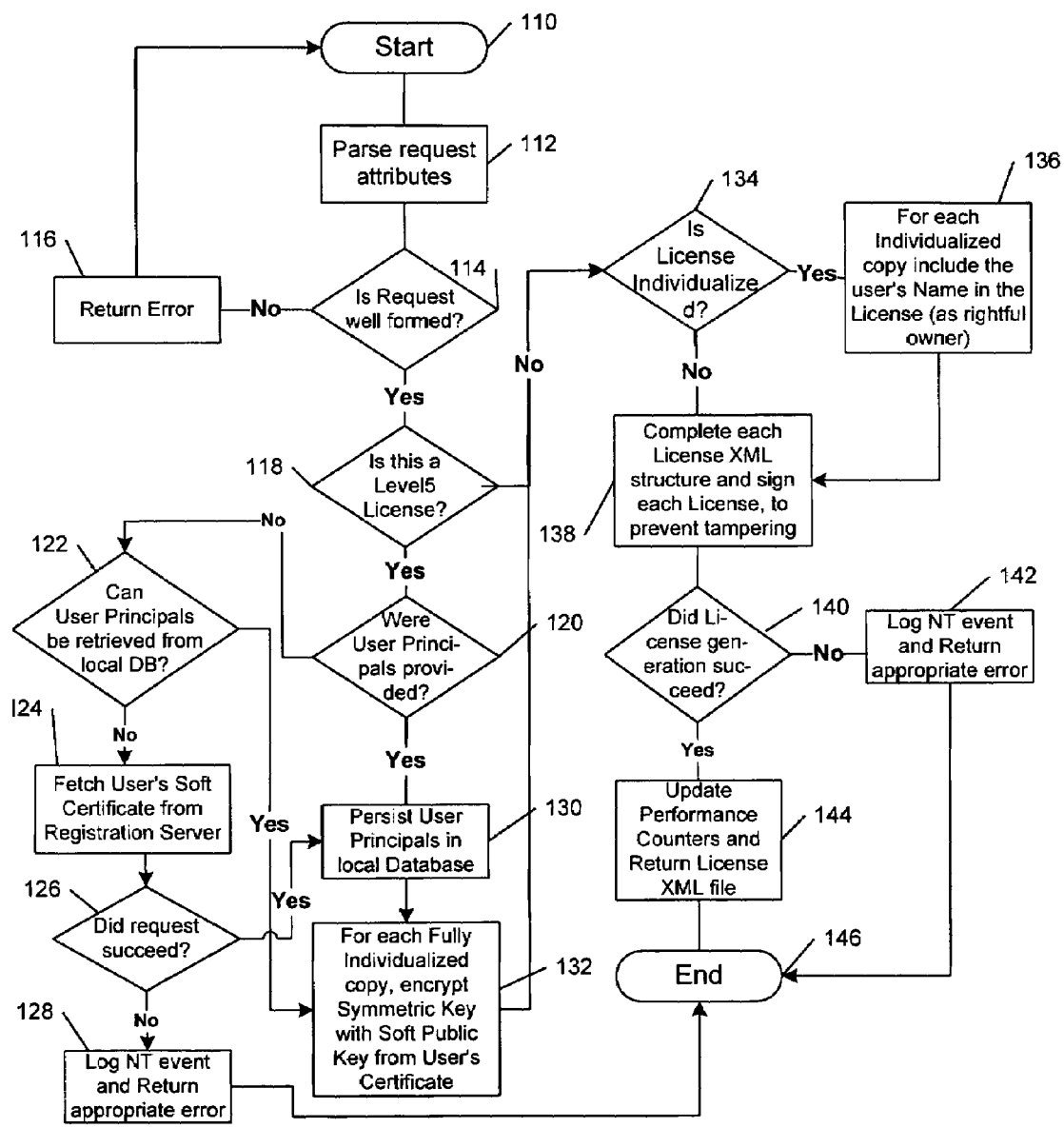
FIG. 7 is a flow diagram illustrating the process of generating a license in accordance with aspects of the invention.

Referring now to FIGS. 4 and 7, there is illustrated the process flow of license generation process. At step 110, the process begins and the request (e.g., the request embodied in the encrypted URL blob) is parsed for attributes (step 112). If the request is well formed at step 114, then it is determined if the request is for a level 5 license (step 118). If not, then at step 116, an error is returned and the process is halted.

If at step 118 it is determined that the request is for a level 5 license, then it is determined at step 120 if the user principles were provided. If they were provided, then the principles are persisted in a local database at step 130. If not, then at step 122, it is determined if the user principles can be retrieved from a local database. If not, then they are fetched from the registration server at step 124, and if successful (step 126), the data is persisted in the local database at step 130. If the request to fetch the data from the registration server failed at step 126, then an event is logged (step 128) and the process ends at step 146.

If at step 122, the user principles can be retrieved from the local database, then processing continues at step 132, where the symmetric key is encrypted with the user's public key from the certificate. Step 132 is also performed after the user principles are persisted in the local database at step 130. Processing then proceeds to step 134, where it is determined if the license is individualized. Step 134 is also where processing continues if at step 118 it is determined that the request is not for a level 5 license.

If at step 134 the license is individualized, the user's name is included in the license as the rightful owner. Processing continues at step 136 where the license XML structure is completed with the user's name and signed. If at step 134, the license is not individualized, process then continues at step 138 where the license XML structure is completed (without the user's name) and signed. At step 140 it is determined if the license generation succeeded. If so, then performance counters are updated and the license XML file is returned (step 144), and, if not, an event is logged and error returned (step 142). Processing then completes at step 146.

Once a download is started at the fulfillment center 73 (i.e., users have placed an order and then clicked on the link to download), in the case of a fully individualized title the download server ISAPI DLL 78 preferably posts a request to the licensing module 77 to generate a unique license for the eBook title being downloaded. The download request URL must provide, as part of the encrypted parameters, information such that the license module can individually seal each license. These parameters include, for level 5 copies, the encrypted activation certificate downloaded to the end-user during activation of their reader software. A licensed eBook cannot be opened unless the required license is present and available to the reader.

After users purchase their eBook devices or download the reader software 90, 92 from the Internet, they will be encouraged to activate their readers the first time it is launched (e.g., immediately after setup for the laptop/desktop reader application). Activation enables the reader software for the purchase of fully individualized, level 5 protected copies. The process-flow of reader activation, the end-user experience, and the client-server interactions that take place will now be described.

Each time reader 90 or 92 is launched, it checks to see whether it has been activated. If not, the reader will render a dialog box reminding the user that they will not be able to acquire premium titles that require full individualization for distribution unless the user activates the reader. Users may activate the reader from any retail web site, while shopping with a stand-alone browser, or from within an "integrated bookstore" feature of the reader (which permits communication with bookstore sites using the reader software itself instead of general-purpose browsing software). Still further, the reader may be activated from within a merchant's site, while shopping inside the integrated bookstore feature of the reader. This activation scenario may occur if, for example, the user declined to activate the reader during first launch and now wants to purchase a fully individualized (level 5 protected) title, which requires activation.

Figure 8:
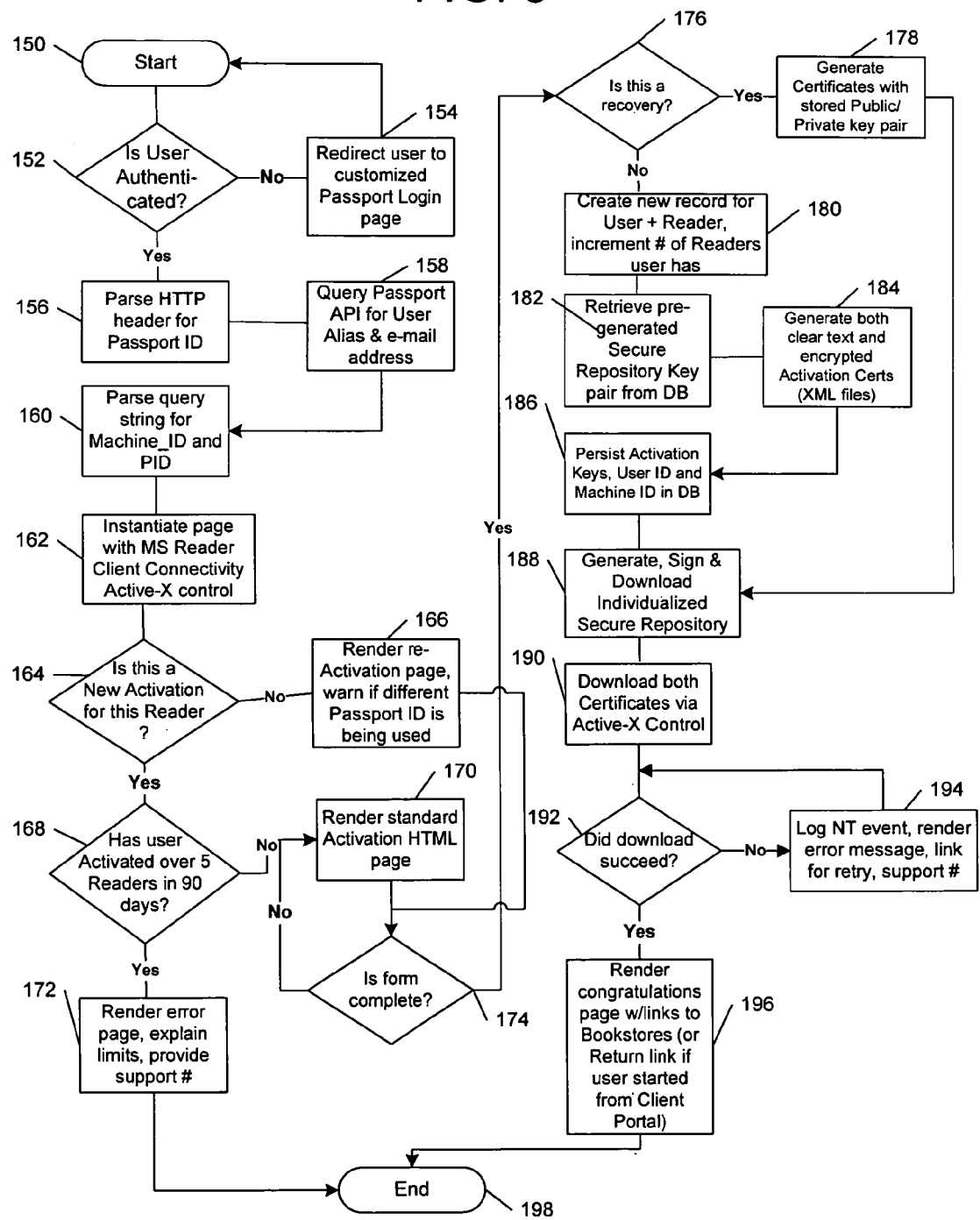
FIG. 8 is a flow diagram illustrating a client reader activation process in accordance with aspects of the invention.

Assuming the user has agreed to activate the reader as above, the process that follows will include the following steps, as illustrated with respect to FIGS. 4 and 8.

At step 150, the reader client opens into the integrated bookstore feature and connects, via secure sockets layer (SSL), to the activation servers 94, where users are prompted to login using, in this example, their PASSPORT™ credentials (step 152). If the user does not have a PASSPORT™ account, he/she will be provided with at link to sign-up for one (step 154). It is preferable that the URL to the activation server 94 be hard-coded into an Activation ActiveX control using a SSL connection such that the client can guarantee that the servers are truly the activation servers 94.

Once user's PASSPORT™ credentials are authenticated (step 156), a PASSPORT™ API is queried for the user alias and e-mail address (step 158). Thereafter, at steps 160–162, the activation servers 94 will request that the client (via the ActiveX control) upload a unique hardware ID (e.g., which, as noted above, may be derived from hardware components on the user's computing device which substantially uniquely identify the user's computing device). Next, it is determined at step 164 if this is a new activation for the reader (as opposed to a "recovery" of a prior activation).

If it is determined that this is a new activation at step 164, then the process proceeds to step 168 to determine whether an activation limit has been reached. If the limit has been reached, then an error message is rendered at step 172, preferably including a support telephone number. The process then ends at step 198. In accordance with a feature of the present invention, users may be limited as to the number of activations they can perform, and/or the rate at which they can perform them (i.e., how many different readers they can activate to read level 5 titles purchased under a given persona). In the example of FIG. 8, users are limited to five activations within 90 days after the first activation of the reader. This allows the users to active their own readers, while preventing abuses of the DAS System. An example of the type of abuse that such a limit prevents would be a book club's purchasing an eBook with its PASSPORT account and permitting thousands of its members to activate their readers with the book club's PASSPORT credentials. The limit on activations may also allow for additional activations as time passes—e.g., one additional activation for each 90 day period after the first 90 days, up to a limit of 10 total activations. It will be appreciated that these limits are merely exemplary, and any limit on activations may be used without departing from the spirit and scope of the invention.

If the user has not activated over five readers within the first 90 days (or reached a different applicable activation limit), an activation page is rendered on the user's device (step 170). When the user returns the form, the activation servers determine whether the form is complete (step 174); if the form is not complete, the process returns to step 170 to re-render the form until the user completes the form. Next, at step 176, it is determined if this activation is a recovery. If it is not a recovery, then a new record is created for the user and reader and the number of readers activated to that user is incremented (step 180). A pre-generated secure repository key pair is retrieved from a database (step 182) and activation certificates are also generated (step 184). The activation keys, user ID, and machine ID are persisted in a database at step 186. In one example, each user (i.e., persona, as identified by, e.g., PASSPORT account) is assigned an activation key pair which is used in the activation certificate for every reader that user activates, in which case the symmetric key 14A of level 5 titles is encrypted with the public key in the activation key pair at the time the title is prepared for that user by fulfillment site 73. In a further refinement of that example, each reading device is equipped with a unique, individualized secure repository that has a unique key pair associated therewith, where the activation certificate for a given device contains its private key in a form encrypted by the public key associated with the secure repository. In this way, in order to render a level 5 title it is necessary for both the secure repository and the activation certificate to be present, since the secure repository uses its private key to decrypt the private key of the activation certificate, which, in turn, is then used to decrypt the symmetric key 14A of the eBook title, which, in turn, is used to decrypt the content stream 16 of the eBook title. Processing continues at step 188.

If, at step 176, it is determined that this activation is a recovery, then (at step 178) activation certificates are generated with the information that was stored at step 186, and processing continues at step 188.

At step 188, the activation servers generate and digitally sign an individualized secure repository executable (tied to the uploaded machine ID) and an activation certificate (tied to the user's PASSPORT™ ID). The secure repository executable and activation certificate are then downloaded to the client (steps 188 and 190). The activation certificate is encrypted (for privacy reasons) and is later uploaded by the client to the download server for preparing fully individualized copies (level 5 protected titles). The user's PASSPORT™ ID may be encrypted and stamped in the PC Registry as part of this download, for upload during commercial transactions. This procedure may ensure that the PASSPORT™ ID included in the URL for download matches that of the activation certificate that's included in the body of the Post, to avoid theft of content.

At step 192 it is determined if the download was successful. If not, an event is logged and the download is attempted again (steps 194 and 192). If the download was successful, then at step 196, the user is provided with a "congratulations page" and is informed that activation is complete. The "congratulations page" may also provided a link to redeem promotional free books at this time, as a way to encourage users to activate their readers. This link may leverage a method exposed by the Activation ActiveX Control to return the user to a library page on the reader. The process then ends at step 198.

It is preferable that once the reader connects to the activation servers 94, that the servers 94 drive the entire user experience via ASP and HTML pages. These pages preferably conform to standard specification, and will use the style guide and java script methods provided to ensure a seamless experience this is consistent with the "look and feel" of the reader user interface.

Part of the activation process for the open platform reader (e.g., a reader software application installed on a PC) is the secure repository individualization and subsequent download. As discussed in greater detail in Ser. No. 09/604,543, filed concurrently herewith and incorporated herein by reference in its entirety, there is provided a server component (e.g., secure repository server 100, shown in FIG. 4) that is responsible for individualizing secure repository software modules to each instance of the reader for open platforms (e.g., laptop and desktop computers). The unique secure repository hides cryptographic keys used in the process of unsealing and decrypting level 5 LIT files, as well as ensuring that decrypted level 5 content does not escape from the controlled system, and, because it is individualized for a particular hardware installation, it resists portability and, should it be broken, its individualization resists using the same breaking techniques on a different secure repository installed on different hardware.

As noted above, one aspect of resisting abuse of the DRM System is to limit the number of activations that any particular user may have with a single PASSPORT™ ID. If this number is not limited, dishonest users may be able sign-up for a "public domain" PASSPORT™ then share the credentials for that account with all of their friends (or worse, post it on the Web), along with all eBooks they purchased. This will quickly create a piracy chain, since any user who activates the reader with the "public domain" PASSPORT credentials could then read level 5 titles individualized for that "public domain" account.

Therefore, in accordance with a feature of the invention, it is desirable to have activation "quotas" that allow users to activate readers on multiple devices that they own (e.g., a laptop, desktop, PocketPC, eBook, etc.) as well as allow them to activate new devices as they upgrade their hardware, reformat their hard disks, etc., without permitting unchecked and unlimited activations of readers to the same PASSPORT credentials. Past experience with user behavior suggests that legitimate users activate one reader (or a small number of readers) initially, and then may activate new readers occasionally but are not likely to activate new readers as often as every day or every week. To enable these legitimate uses of the activation system, while preventing abuse, the number of activations for a given user (a Passport™ ID) will be periodically increased, up to a defined maximum (which will be, e.g., five activations initially). As the user activates new devices, his quota of available activations goes down. As time passes, the number is increased, at a suggested rate of, e.g., one additional activation every 90 days (from the date of the first Activation) until the number reaches 10. This type of limit will allow users to activate readers (or reactivate, say, old readers on devices with reformatted hard disks) with a reasonable frequency, and will resist abuse of the system by "pirates."

The activation servers 94 enforce the limit on activations by storing, in the activation database 102, a list of all activations that a given PASSPORT™ ID has requested, along with their date stamps. If a re-activation request is made, the quota is not affected, so long as the machine ID (e.g., the unique number that ties the secure repository to the hardware hosting the reader) is the same (since this would not result in theft, as the same PC is being activated again).

eCommerce Process Flow

Figure 9:
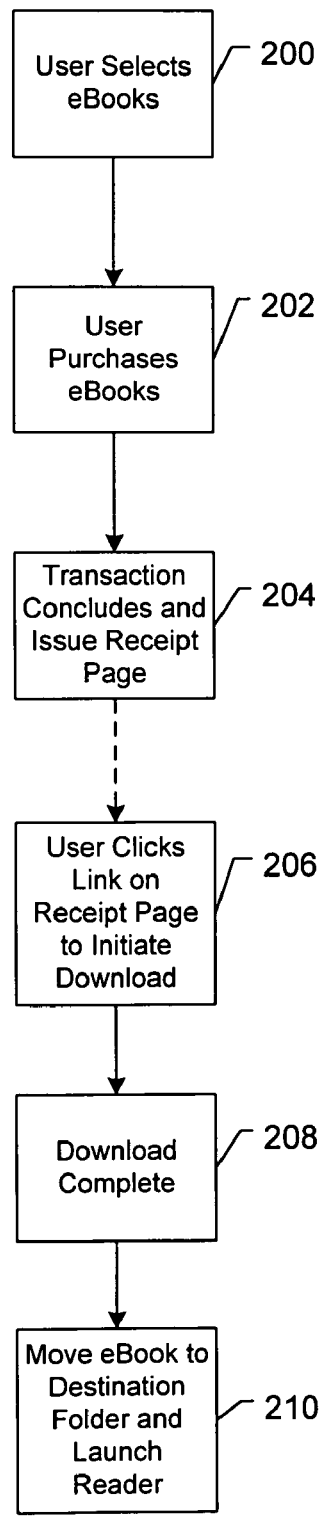
FIGS. 9 and 10 are flow and block diagrams illustrating an eCommerce flow in accordance with aspects of the invention.

An overview of the basic process by which eBook titles are acquired and delivered online is now described with reference to FIG. 9. Using a browser or the "bookstore pages" or reader 90 or 92, user chooses book(s) via mechanisms that the retail site implements (step 200). The user then pays for the titles, if payment is required (step 202). The transaction concludes at step 204 with a receipt page (i.e., an order confirmation or "thank you" page) that contains links (POST requests) for downloading each title purchased (i.e., the URLs containing the address of content server 76, plus the encrypted information created by URL encryption object 74). For fully individualized copies (level 5), a client-side script will populate the body of the POST with the activation certificate, preferably using COM object implemented by the reader which obtains the necessary activation certificate or relevant information therefrom.

Upon clicking on any of the links at step 206, the browser initiates a download from content servers 76 (via the download server ISAPI DLL 78). For individually sealed (bookplate (e.g., level 3)) copies, the download server 76 adds the consumer's name to the title meta-data and re-seal the symmetric key 14A using a new cryptographic hash resulting from the new meta-data, which now includes the user's name. For fully individualized copies (level 5) a license is generated and embedded in the LIT file, in addition to the Bookplate being created. This license contains the symmetric key 14A that encrypted the LIT file "sealed" with the public key in the activation certificate. When the download is complete (step 208), the download server 76 logs the transaction and, on the client, the reader is launched automatically (step 210). The title may be moved into a "My Library" folder (e.g., on a PC using one of the MICROSOFT WINDOWS operating systems, such a folder might be called C:\MyLibrary, and would be reserved for the storage of LIT files). The eBook is opened to its cover page and the rightful owner's name is rendered under the author's name.

Figure 10:
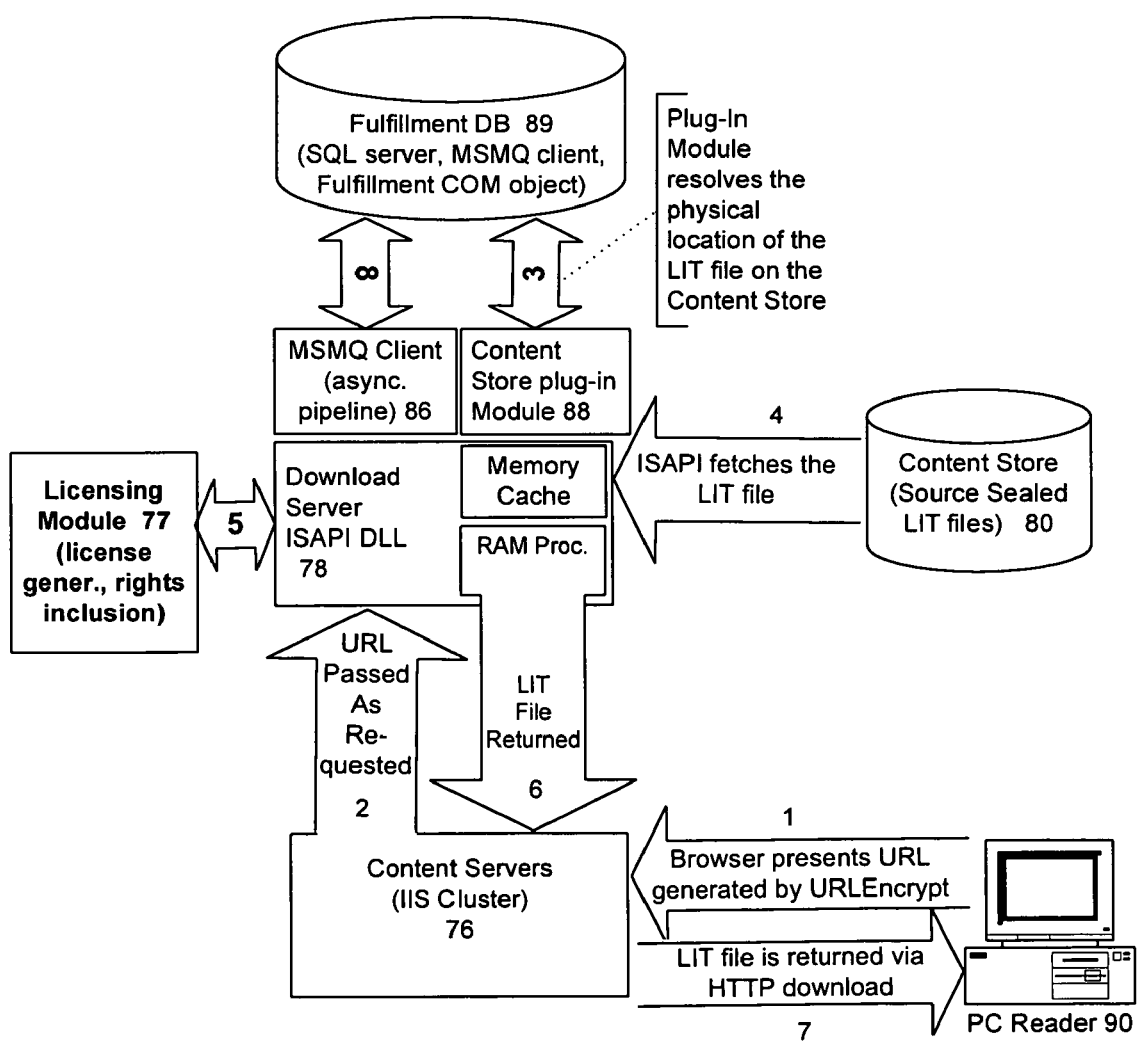

The eCommerce process is further detailed in FIG. 10 with specific reference to the components of the DAS system. At step 1, the client 90 or 92 makes a POST request to the download server ISAPI DLL 78. The body of this post request will contain, at a minimum, the encrypted blob generated by the URL encryption object 74. For fully individualized copies (level 5 protected) this post request will also contain the activation certificate required when sealing the XrML license (see below).

During step 2, the ISAPI 78 extracts, from the body of the POST, the Retailer ID, which is required for fetching the symmetric key 75 associated with this retailer for decrypting the URL. It then decrypts and validates the download request. If the request is invalid and/or the TTL computed has expired (e.g., a possible play-back attack), the download server may redirect the browser back to the bookstore site. The bookstore site 71 should always be encapsulated in the HTTP REFERRER server variable. During this step, an optional friendly filename may be provided via the encrypted blob. This string, when returned, will be used by the ISAPI as the filename when downloading the LIT title to the end-user.

At step 3, the ISAPI 78 passes the Book ID and Book ID type to the content store plug-in module, which then returns the physical location of the LIT file on the content store based on either a memory cache entry (if the LIT file being requested had been previously downloaded) or a lookup on the fulfillment database 89.

At step 4, if the Book ID is not found on the local memory cache of the ISAPI 78, the LIT file is retrieved from the content store 80 and copied into the local memory cache of the ISAPI. When the ISAPI caches the LIT files locally, it strips the LIT files from their symmetric keys 14A and stores them on a separate cache bucket, indexed by their respective ID, which may increase security.

At step 5 the ISAPI 78 will perform one of these possible steps in accordance with the DRM level required for the LIT file being downloaded:

If the request is for a DRM level 1 file, or the LIT file is not source sealed in the content store 80, the IASPI preferably returns an error, indicating that the proper error condition (invalid request or an invalid title in the content store, respectively).

For source sealed (level 2) titles, the ISAPI return the file to the end-user, with no processing done on the file whatsoever. This is similar to downloading any other static file.

For individually sealed titles (level 3), the user's name will be inserted into a new stream in the LIT file, the meta-data stamped with level 3 (for use by the reader client 90 or 92), the new meta-data is hashed, and the symmetric key 14A used to encrypt the LIT file is sealed with the new cryptographic hash value computed.

For fully individualized titles (level 5), the ISAPI 78 will, in addition to generating the functions note above for level 3, post a request to the licensing module 77, which will generate a license XrML blob, sign it with the fulfillment center's certificate, seal it with the end-user's activation public key, and return it for embedding in the LIT file.

For both levels 3 and 5, all processing is carried out in the temporary memory space created during step 4. This memory space will be later discarded by the ISAPI, when the download is complete.

At step 6 the ISAPI DLL returns the LIT file to the IIS server 76 for download. If, during step 3, the content store plug-in module returned a "Friendly Name" string, this value is used in the HTTP header as the filename to be stored in the user's machine.

At step 7 the LIT file is downloaded by. IIS to the end-user via HTTP. When the download is complete, IIS will call back into the ISAPI DLL 78 to notify that the pending request was fulfilled and the connection closed. The ISAPI 78 will then purge all temporary memory used during step 5.

At step 8, the ISAPI DLL 78 will use the asynchronous fulfillment pipeline (via the local MSMQ Independent Client 86) to log the transaction into the logging database 91 for later reporting and/or billing. This pipeline is also used to invalidate cache entries in the memory of the ISAPI asynchronously, such that any modifications to content store 80 performed by content management tool 82 will cause the ISAPI to invalidate the cached data and fall back to the plug-in module 88 (and subsequently the content store 80) to retrieve the LIT file for the invalidated cache entry.

Once the eBook title has been downloaded to the client (after step 7), the reader client may be launched. This is enabled via a file-extension association of LIT to the reader. The reader may move the file into the local library folder (e.g., "C:\MyLibrary") and open the book to its cover page, which for level 3 titles, clearly identifies the owner beneath the author's name.

Content Management Functionality

Once of the steps in securing the content in a DRM environment is the pre-encryption of the source files (LIT files) using symmetric keys 14A generated by the encryption tool. This process enables the download server 76 to seal the symmetric key 14A according to the requirements of each DRM Level. The fulfillment center 73 is responsible for populating the content store 80 according to their existing coding and cataloguing infrastructure. The fulfillment center 73 is also responsible for communicating the Book ID, Book ID Type, and their associated metadata to the retailers hosting bookstores that point to the content provider's site for fulfillment.

In accordance with a feature of the present invention, there may be independence between the download server 76 and the fulfillment center's content store servers 80. Every Book ID/Book ID Type pair that comes on the URL provided by the retailers 71 will be resolved into a physical path to a LIT file via the content store plug-in module 88, which can be customized by each fulfillment center 73. This provides for maximum flexibility and scalability of the content store repository as well as the download server ISAPI DLL 78.

A bookstore (retailer) database is populated with the Book IDs generated by a tool for managing the LIT files of a particular content provider's data center. This process is assumed to take place asynchronously and via contractual agreement between the retailer 71 and the content provider (fulfillment center) hosting the content servers 76. These IDs will be provided to the download server ISAPI DLL 78 via the URL (in the encrypted portion of the URL).

Design Considerations

Exemplary schemas for the various tables used on the DAS Databases are described below. The exemplary schemas are not to be considered as limiting the present invention, as other schemas are possible.

Fulfillment Database

There are three tables in the exemplary fulfillment database. They include an DAS_Product table that contains all the information required to process a download request, an DAS_Registered_Retailers that contains all the information on retailers that are allowed to fulfill titles using this fulfillment installation of DAS, and an DAS_Licensor_Config that contains the required Licensor License provided by Microsoft for each DAS installation Partner. There are no relationships required between these tables; however, if table relationships are necessary, then each table's unique identifiers (primary keys) are used.

```
DAS_Product Table
(
    DAS_BookID_Path_Mapping_ID  int     not null IDENTITY(1,1),
    BookID           varchar(256)   not null,        -- example "0-201-63446-5"
    BookIDType       varchar(32)    not null,        -- example "ISBN"
    Title            varchar(256)   not null,        -- example "Tarzan of the Apes"
    Publisher        varchar(256)   not null,        -- example "Ballantine Books"
    UNCPath          varchar(256)   not null,        -- example "\\Store\tarzan.lit"
    Price            varchar(32)    not null,        -- example "6.59"
    PriceStructure   varchar(32)    not null,        -- example "Retail"
    Currency         varchar(10)    not null,        -- example "USD"
    SecurityLevel    varchar(32)    not null,        -- example "5"
    DateUpdated      datetime null DEFAULT (getDate( )),  -- last time row was updated
    DateCreated      datetime null DEFAULT (getDate( ))   -- time when row was created
)
```

DAS_Registered Retailers Table

This table contains the Retailer ID and secret string that is used when computing the symmetric key 75 used to encrypt/decrypt URLs for fulfillment. Each string must match the string used by the retailer when installing the URLEncrypt COM object, since that's how each download request is authenticated.

```
(
    DAS_Registered_Retailers_ID  int            not null IDENTITY(1,1),
    RetailerID       varchar(256)   not null, -- example "Retailer-111-888"
    RetailerName     varchar(256)   not null, -- example "Barnes & Noble"
    RetailerDesc     varchar(4096)  not null, -- example "Book retailer"
    SharedSecret     varchar(256)   not null, -- example "Making_eBooks_Happen"
    DateUpdated      datetime null DEFAULT (getDate( )),
    DateCreated      datetime null DEFAULT (getDate( ))
)
```

DAS_Licensor_Config Table

This table contains the configuration settings for the licensing component of the download server. When the server starts, the licensor's certificate and licensor's private key are read out of this table and used to generate Level 5 licenses for LIT files. It is preferable to store this information on the SQL server because the data is too large to be stored in the local registry of the download server, and because of security concerns that the private key of retailers may be compromised if stored in a flat file. It also allows for easy changes to the download server configuration parameters, since DAS partners only have to modify this table in the fulfillment database 89 and all download servers will pick-up the change (via the asynchronous fulfillment pipeline and messaging component), simplifying management.

Activation Database

The activation database 102 hosts all the required information for activating readers as well as configuration information to operate the activation servers. There are five tables in the activation database. The Key_Pairs table holds the key pairs used when generating activation certificates. The Users table hosts the PASSPORT™ credentials for each activated user, along with the key pair ID (link into the Key_Pairs table) and date of first Activation. The UsersDevices is a list of all Hardware IDs (i.e., Machine IDs) activated by all users. In order to identify which machine is being referenced, this table has a primary-key constraint on UserNum (an internal representation of each user on the Users table) and MachID (the computed machine ID). The KeyPtr tracks the number of key pairs used from Key_Pairs table. It also points to the next available key pair to be used. The AS_DB_Config holds configuration elements for the database and the activation servers 94.

```
(
    DAS_Licensor_Config_ID    int              not null IDENTITY( 1,1),
    LicensorCertificate       varchar(4096)    not null, -- signed licensor's certificate
    LicensorPrivateKey        varbinary(350)   not null, -- binary form of licensor's private key
    DateUpdated               datetime null DEFAULT (getDate( )),
    DateCreated               datetime null DEFAULT (getDate( ))
)
```

Logging Database

The logging database 91 is used to log of all download requests. As the download servers process requests, the asynchronous fulfillment pipeline (based on MICROSOFT® Message Queue Server) is used to write, via a COM Object resident on the fulfillment database server, each message from the queue into the DAS_Log table. This will allow the DAS sites to audit their fulfillment, and determine how many downloads took place, and when, and what are the most frequently downloaded titles, etc. This table may also be used for billing purposes. The logging database comprises a single table (DAS_Log) that contains all the transaction logging records from downloaded titles.

```
(
    DAS_Log_ID      int              not null IDENTITY(1,1),
    BookId          varchar(64)      not null, -- example "0-201-63446-5"
    BookIdType      varchar(32)      not null, -- example "ISBN"
    SecurityLevel   varchar(32)      not null, -- example "5"
    NameOfFile      varchar(256)     not null, -- example "Alice30.lit"
    CustomerID      varchar(256)     not null, -- example "34235433"
    UserName        varchar(256)     not null, -- example "Pavel Zeman"
    TransactionId   varchar(256)     not null, -- example "123-456-789"
    License         varchar(4096)    null,     -- only for Level 5 content - text of the License
    RetailPrice     varchar(32)      null,     -- example "$6.59"
    Cost            varchar(32)      null,     -- example "$5.59"
    MSRP            varchar(32)      null,     -- example "$7.59"
    DownloadAgent   varchar(256)     null,     -- example "Mozzilla"
    IPAdress        varchar(32)      null,     -- example "123.456.789.000"
    DateLogged      datetime null DEFAULT (getDate( ))
)
```

| Key_Pairs Table | | |
| --- | --- | --- |
| ( | | |
| ID_Key_Pair | int | not null UNIQUE IDENTITY(1,1), |
| PublicKey | KeyValue | not null, |
| PublicKeyXML | KeyValue | not null, |
| PrivateKey | KeyValue | not null, |
| BinaryPrivateKey | BinKeyValue | not null, |
| AssignedToReader | tinyint | null DEFAULT(0), |
| | | /* link to UsersDevices.ID_UsersDevice */ |
| DateAssigned | smalldatetime | null DEFAULT (NULL), |
| DateCreated | smalldatetime | null DEFAULT (getDate( )) |
| ) | | |

| Users Table | | |
| --- | --- | --- |
| ( | | |
| UserNum | int | not null UNIQUE IDENTITY(1,1), |
| FullName | varchar(60) | null, |
| Email | varchar(60) | null, |
| UserId | varchar(60) | not null PRIMARY KEY, |
| DateMade | smalldatetime | null DEFAULT (getDate( )), |
| ID_KeyPair | int | not null |
| ) | | |

| UserDevices Table | | |
| --- | --- | --- |
| ( | | |
| UsersDeviceNum | int | not null UNIQUE IDENTITY(1,1), |
| MachId | varchar(255) | not null, |
| UserNum | int | not null, |
| DateRegistered | smalldatetime | null DEFAULT (getDate( )), |
| ID_KeyPair | int | not null, |
| TimesRegistered | int | null DEFAULT (0), |
| CONSTRAINT PC_UNQ PRIMARY KEY (UserNum, MachId) | | |
| ) | | |

| KeyPtr Table | | |
| --- | --- | --- |
| ( | | |
| NextKeyToUse | int | not null |
| ) | | |

| AS_DB_Config Table |
| --- |
| ( |
| /* when number of free keys drop below this number a scheduled GenKey job is adding keys */ |
|     MinKeysAvailable    int    not null, |
| /* initially user can activate this many PCs */ |
|     MaxPCperUser    int    not null, |
| /* if user reached limit above, but this period has elapsed since his last Activation, user can add one more */ |
|     GrantExtraPCPeriodInDays    int    not null, |
| /* to prevent DOS (denial of service) attacks by re-Activation of same PC over and over, this can be set in production to a low value (e.g. 3), but test can set it to high for stress tests */ |
|     MaxSamePCregistrations    int    not null |
| ) |

DRM Storage within LIT Files

Every LIT file is in effect a small file system, consisting of a collection of storage elements and their associated streams. At the root of every LIT file is a dedicated storage object for DRM. The sub-streams of the DRM storage object will vary depending on the DMR level via which the LIT file was distributed. In a level 5 protected LIT file, a Data Store contains the actual content of the eBook, and a DRMStorage Store contains all DRM-specific binary data. The DRMStorage Store will include ValidationStream, DRMSource, and DRMSealed streams (for Source and Individually Sealed copies). For fully individualized titles, the LIT file will also include the licenses stream, which includes one End-User-License (EUL).

License Format

Below is an exemplary License, which is used for every download of fully individualized titles. The license is a construct that defines the rights that the user can exercise upon purchase of the title, in addition to defining the requirements for unsealing the symmetric key to exercise those rights. Examples of "rights" that could be represented in the license are rendering the content (e.g., in the example of text content, reading it on the monitor of a PC), printing the content, or copying-and-pasting portions of the content. It is noted that the exemplary license format is not intended to limit the scope of the present invention as other license formats having greater or lesser information are possible, as are licenses having license information in different formats.

It is preferable that language chosen to represent a License is XML, and the format of the License is based on the Extended Rights Markup Language (XrML) specification. This is a well-suited markup language to describe usage rights in a flexible manner. XrML also provides for great interoperability and may allow for any technology investments made on components that generate and manage these licenses to be leveraged long-term. In a preferred embodiment, only those expressed in the license are granted to the license—i.e., if a right is not expressly granted, it is denied. However, it will be appreciated by those skilled in the art that other arrangements are possible, such as where a default set of rights is presumed unless expressly denied or modified by the license.

The top-level tags in a collapsed format are as follows:

```
<?xml version = "1.0" ?>
    <!DOCTYPE XrML SYSTEM "xrml.dtd">
    ± <XrML>
        ± <BODY type = "LICENSE" version = "2.0">
            <ISSUED>2000-01-27T15:30</ISSUED>
            ± <DESCRIPTOR>
            - <!-- ================================================ -->
            - <!-- Licensed Book -->
            - <!-- ================================================ -->
            ± <WORK>
                ====================================================
                    Components of the book
                    One chapter, and one image with digest value
                ====================================================

====================================================
                    Usage rights of the book
                ====================================================
            - <!-- ================================================ -->
            - <!-- Licensor of the book -->
            - <!-- ================================================ -->
            ± <LICENSOR>
            - <!-- ================================================ -->
            - <!-- Licensees of the book -->
            - <!-- ================================================ -->
            ± <LICENSEDPRINCIPALS>
        </BODY>
        - <!-- ================================================ -->
        - <!-- Signature of the License Body -->
        - <!-- ================================================ -->
        ± <SIGNATURE>
</XrML>
```

The first line of the XrML structure above defines the version of the XML language used to create the XrML License. The second line specifies the name of the DTD file used to parse the XML file. The BODY tag provides the type of license, the version of the XrML specification used when the license was generated, and the date when it was issued. It is also the meta-tag for the whole license, which has the following sub-sections: WORK, LICENSOR, LICENSEDPRINCIPALS, and SIGNTURE. WORK contains all the semantic information about the license, including the usage RIGHTS. The contents of this field (including the tags) constitute the data that is hashed and signed. LICENSOR contains information pertaining the entity that issued the license, usually a retailer. LICENSEDPRINCIPALS contains a series of principals that must be authenticated when exercising the usage rights specified in a license. SIGNATURE contains the hash/digest of the LICENSEBODY as well as information about how the hash was created, including the algorithm used. It also includes the DIGEST encoded in accordance with the algorithm named by the Licensor when issuing the License. The DIGEST and SIGNATURE tags provide the authentication information used to validate the entire license in a way that cannot be tampered with.

The main tag of an XrML license construct is the BODY tag, which contains tags as shown in the computer program listing appendix that has been incorporated by reference herein.

Structure of the BODY tag

License Authenticity

As mentioned before, the reader secure repository authenticates a license via the SIGNATURE and DIGEST tags. This is such that the client software can validate that the content being rendered came from a trusted source. A more detailed example of these tags is provided below:

```
- <!-- ================================================
        Signature of the License Body
    ================================================
    -->
= <SIGNATURE>
    = <DIGEST>
        <ALGORITHM>SHA1</ALGORITHM>
        = <PARAMETER name="codingtype">
            <VALUE encoding="string">surface-
                coding</VALUE>
        </PARAMETER>
        <VALUE encoding="base64"
            size="160">OtSrhD5GrzxMeFEm8q4pQICKWHI=
            </VALUE>
    </DIGEST>
    <VALUE encoding="base64"
        size="512">A7qsNTFT2roeL6eP+IDQFwjIz5XSFBV+NB
        F0eNa7de+1D6n+MPJa3J7ki8Dmwmuu/pBciQnJ4xGaq
        RZ5AYoWRQ==</VALUE>
</SIGNATURE>
```

DRM System Content Sources Scenarios

The source content is preferably distributed in Open eBook ("OEB") format, which will be later customized by the Retailer to each target Reader. The OEB format is specified in the document entitled *Open eBook™ Publication Structure* 1.0, dated Sep. 16, 1999, which available at http://www.openebook.org/specification.htm and is expressly incorporated herein by reference in its entirety.

Content Sources Scenarios

Within the context of the DRM System, content sources (authors and/or publishers) of eBooks are expected to provide either open (i.e., unsealed) or sealed copies that are ready for sale. In order to be distributed by the server described below, publishers must provide copies that have been at a minimum source sealed, or alternatively, the publishers may optionally provide source OEB/HTML files that the merchant/distributor will encrypt and store for fulfillment. The content sources may also provide a separate file (e.g., XML, text, database script, etc.) that will provide merchant-specific information about each title being distributed which will be used by the merchant/distributor to populate their fulfillment databases. Such information may include the desired DRM level, pricing, teaser, etc.

Because there is an expectation that a trust relationship between publishers and retailers is preferably maintained contractually and not technologically, it is generally not necessary to encryption and/or sealing titles between publishers and merchants/distributors. Such a relationship provides for a simpler deployment. If, however, added security is a concern, the present invention provides for titles that may be encrypted when transferred between publishers and merchants/distributors.

In accordance with the present invention, publishers may distribute the content to retailers via one of delivery of portable mass-storage medium (CDs, DVDs, etc.); secure FTP servers in either the publisher or the merchant/distributor site; secure HTTPS (SSL) on either the publisher or the merchant/distributor site; and secure dedicated network connections between the publisher and the merchant/distributor sites.

Merchant/Distributor Scenarios

Several non-limiting distribution scenarios will now be described. The scenarios are intended to provide examples of the of sales to customers, and is not intended to limit the present invention as other scenarios are possible.

Sales of Source Sealed Copies

After the buying customer has selected the titles he/she wishes to purchase and decides to complete an order, the merchant will process the order according to their existing methods (e.g., credit card validation, billing, etc.). This may include requiring the users to authenticate themselves (for those which require a membership record from their customers) or simply fill out an order form. The merchant will next generate and download a receipt (electronic proof-of-purchase) to the buying customer. As noted above, it is preferable that the electronic receipt include all the information required to enable the user to later download the titles they purchased via a mechanism such as a URL that points to the content server 76 and contains the encrypted blob generated by the URL encryption object. Once the user clicks on the URL included in the electronic receipt for downloading the title purchased, the server listed in that URL (i.e., the fulfillment or content server) downloads the referenced title to the purchaser. The content/download servers 76 may validate that the order was indeed placed by the user attempting to download the title.

As previously mentioned, source sealed copies may indelibly include the name of the publisher and/or author and any other rights that have been delegated to the merchant as part of the distribution process. The merchant/distributor uses tools to encrypt the title with a symmetric key 14A provided by those tools. These same tools will encrypt the symmetric key 14A with a cryptographic hash of the title's meta-data and embed the encrypted symmetric key 14A in a separate stream in the title. When the reader software opens these titles, it will apply the same algorithm used by the tool to decrypt the symmetric key and then use it to decrypt the content. It is noted that titles purchased in this manner may be easily re-distributed by the end-users (e.g., by posting the LIT file on the Web, or by saving it on magnetic disk 29 or optical disk 31 and sending the disk to another user); thus it is recommended that the merchant provide warnings regarding illegal distribution in every receipt. The owners of titles sold this way are encouraged to include copyright information as part of the publication.

Sales of Individually Sealed Copies

Similar to source sealed copies, individually sealed copies (e.g., level 3) require the retailer to name the rightful owner of the title in the meta-data, and then seal the symmetric key 14A used for encryption/decryption of the content with a new cryptographic hash of the new meta-data, which now includes the owner's name. This advantageously makes the meta-data tamper-resistant, since any attempt to change the meta-data (e.g., remove the rightful owner's name so that the rightful owner could distribute the copies and escape detection) would cause any attempt to unseal the symmetric key 14A to fail, because the wrong cryptographic hash would result. However, like unsigned and unsealed copies, and like source sealed copies, these titles do not provide any proactive copy protection; instead, individually-sealed copies protect the owner's rights in the works by relying on the deterrent effect that a user whose name is bound to the copy and who engaged in illegal distribution of the copy could be easily discovered.

In the scenario, the retailer generally provides the consumer's name, as it appears on his/her credit card, as a parameter on each download URL included in the receipt (i.e., proof of purchase) page/e-mail. This information is used by the download servers 76 during fulfillment to add the user's name to the meta-data. Use of the name associated with a credit card is preferably, because, assuming that the credit card is not stolen, it is a reliable source of the user's name; if the name provided by the retailer is based on, say, user input, there is a greater danger that the user would enter a fake name that would not serve the goal of binding the user's real name to the copy.

Sales of Signed Copies

Signed copies (e.g., level 4) are titles that include a digital signature, which was provided by the content source (author and/or publisher) at the time the title was generated. This is the mechanism used to provide authenticatable copies, by having the data in the LIT file (or a portion thereof) signed by various entities in the distribution chain. Level 4 can be combined with other levels—e.g., it is possible to combine source signing with either level 3 or level 5 individualization in order to create a title that is both authenticatable and copy-resistant (or, in the case of level 3, copy-"deterred").

Sales of Fully Individualized Copies

Fully individualized copies differ from individually sealed titles in that at the time of fulfillment, the merchant/distributor must always seal the license by encrypting the symmetric key 14A to the end-user's public key in the end-user's activation certificate. The public key's authenticity is attested to by the activation certificate, which is signed by the activation servers 94. A merchant may request the signed activation certificate the first time a particular consumer purchases any fully individualized title. Optionally, merchants could request such certificate on every transaction, if the user does not have a membership or other relationship with the merchant. The encrypted activation certificate is provided to a retailer by a client component of the DRM system, which can be scripted to via any web page. This certificate is encrypted to protect the privacy of the consumer as well as reduce the risk of playback attacks and/or hacking. It is preferable that merchants store the encrypted activation certificate on their sites for future transactions.

Titles sold as fully individualized copies may only be opened on the purchasing consumer's reader(s) and cannot be distributed openly. As part of the process of selling fully individualized titles, merchants may detect whether the end-user's reader has been activated, which is a requirement for downloading such titles. If a merchant detects that a reader is not activated, the merchant may advise the reader that activation is necessary to open a fully individualized title. In the case where the merchant does not store a particular user's activation certificate, it would not even be possible to provide a fully individualized title for that user. In the case where the merchant stores the activation certificate, the merchant may, for example, detect that the reader installed on the user's device through which the user is purchasing the title has not been activated (although that user may have other activated readers), in which case the merchant may provide the title to the user, but may advise the user that they must activate the new device in order to use the title on that device (subject, of course, to any applicable limit on activations).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for providing a content item, said system comprising:

a plurality of download servers, wherein each download server receives a request for said content item, said request comprising encrypted data that represents a public key associated with a user from whom said request is received and an identification of said content item, said request having been generated at a first server with which said user has previously engaged in a transaction to purchase said content item, said encrypted data having been encrypted with a first key, each of said download servers having:

a cache which stores said content item; and a first object which receives a first message to invalidate said content item in said cache and which invalidates said content item in said cache in response to receipt of said first message; and a fulfillment server having:

a content store which stores said content item; and a first database which stores information relating to said content item; and a second object which receives a notification that said information in said first database has been updated or deleted, and which generates, in response to said notification, said first message for dispatch to said plurality of download servers, said first server being separate from said plurality of download servers and from said fulfillment server, said first key being known to said first server and to said plurality of download servers but not to said user, each of said plurality of download servers comprising logic that applies said first key to said encrypted data to retrieve said identification of said content item and said first key, and that uses said public key to encrypt a second key that is used to decrypt said content item, said content item being provided to said user in a form encrypted with said second key and including said second key in a form encrypted by said public key.

2. The system of claim 1, wherein said fulfillment server further includes a second database which stores a log of events occurring on said plurality of download servers, wherein each of said plurality of download servers generates a second message for dispatch to said fulfillment server in response to said events, and wherein said second object receives said second message and logs said events in said second database.

3. The system of claim 1, wherein said events include the downloading of said content item to said user who is a purchaser of said content item, said user having engaged in a purchase transaction with said first server, said first server including functionality to determine whether to generate said request or not to generate said request depending on whether the user has completed said purchase transaction.

4. The system of claim 1, wherein said content item is sold by a retailer for download by one of said plurality of download servers, and wherein said first database further stores information relating to said retailer.

5. The system of claim 4, wherein said plurality of download servers is hosted by said retailer.

6. The system of claim 1, wherein said user has previously obtained said public key by engaging in a transaction with a second server that distributes and installs public keys and their corresponding private keys on machines, said second server comprising logic that performs acts comprising:

maintaining an association between said user, said public key, and a private key associated with said public key;

receiving a request to install said public key and said private key on a machine;

authenticating the user from whom the request is received as a condition to installing said public key and said private key on said machine;

determining that a limit on the number of machines on which said user's public key and private key may be installed has not been exceeded as a further condition to installing said public key and said private key on said machine; and installing said public key and said private key on said machine by delivering a certificate that includes said public key and said private key with at least said private key being encrypted by a platform public key that is associated with, and relatively unique to, said machine.

7. The system of claim 1, wherein each of said first and second object is an instance of an MSMQ independent client.

8. A computer-implemented method of using a plurality of servers to distribute a content item, said method comprising the acts of:

receiving, at a first of said plurality of servers from a first computing device, a request for said content item, said first server having a first cache;

determining that no valid copy of said content item exists in said first cache;

obtaining said content item at said first server from a content store;

providing said content item to said first computing device;

storing said content item in said first cache;

receiving, at a fulfillment server, a change to an attribute of said content item, said attribute being stored at said fulfillment server;

said fulfillment server sending a notification to said plurality of servers in response to said change; and said first server invalidating said copy of said content item in said first cache in response to said notification, each of said plurality of servers comprising logic that performs acts comprising:

receiving, from a user, a request to provide said content item to a user, said request comprising a public key associated with said user and an identification of said content item, said public key and identification being in an form encrypted by a first key that is known to each of said plurality of servers and to a first server at which said request is generated but that is not known to said user, said public key being installed by an activation server on a plurality of machines associated with said user.

9. The computer-implemented method of claim 8, wherein said act of sending a notification comprises using a store-and-forward messaging facility.

10. The computer-implemented method of claim 8, wherein said change comprises a change in a physical location of said content item.

11. The computer-implemented method of claim 8, wherein said activation server enforces a limit as to the number of machines associated with said user on which said public key may be installed, said limit being initially set to a first number, and said limit being increasable beyond said first number if a standard that governs the increase in said limit has been met, said public key being installed on each of said users machines along with a private key corresponding to said public key in a manner so as to make an installation of said private key unusable if said installation of said private key is copied to a machine other than a machine on which said private key has been installed by said activation server.

12. The computer-implemented method of claim 8, wherein said content item comprises:

encrypted content; and a first cryptographic key which decrypts said encrypted content.

13. The computer-implemented method of claim 12, wherein said content item further comprises meta-data, wherein said first cryptographic key is sealed with said meta-data.

14. The computer-implemented method of claim 12, wherein said encrypted content is stored in said cache separately from said first cryptographic key.

15. The computer-implemented method of claim 8, wherein said change comprises a change in the meta-data of said content item.

16. A computer-readable medium encoded with computer-executable instructions to perform a method of using a plurality of servers to distribute a content item, the method comprising:

receiving, at a first of said plurality of servers from a first computing device, a request for said content item, said request being received from a user and having been generated at a server remote from said user, said request comprising an identification of a content item and a public key associated with said user, said request being in a form encrypted with a first cryptographic key that is known to said plurality of servers and to said server remote from said user, but that is not known to said user, said content item being encrypted in a form that is decryptable with said first cryptographic key, said first cryptographic key being included in said content item in a from encrypted with said public key, said first server having a first cache;

determining that no valid copy of said content item exists in said first cache;

obtaining said content item at said first server from a content store;

providing said content item to said first computing device;

storing said content item in said first cache;

receiving, at a fulfillment server, a change to an attribute of said content item, said attribute being stored at said fulfillment server;

said fulfillment server sending a notification to said plurality of servers in response to said change; and said first server invalidating said copy of said content item in said first cache in response to said notification.

17. The computer-readable medium of claim 16, wherein said act of sending a notification comprises using a store-and-forward messaging facility.

18. The computer-readable medium of claim 16, wherein said change comprises a change in a physical location of said content item.

19. The computer-readable medium of claim 16, wherein said change comprises a change in a level of protection to be applied to said content item.

20. The computer-readable medium of claim 16, wherein said content item comprises:

encrypted content; and said first cryptographic key which decrypts said encrypted content.

21. The computer-readable medium of claim 20, wherein said content item further comprises meta-data, wherein said first cryptographic key is sealed with said meta-data.

22. The computer-readable medium of claim 20, wherein said encrypted content is stored in said cache separately from said first cryptographic key.

23. The computer-readable medium of claim 16, wherein said change comprises a change in the meta-data of said content item.

* * * * *